(12) United States Patent
Alvarez-Icaza Rivera et al.

(10) Patent No.: US 10,176,063 B2
(45) Date of Patent: Jan. 8, 2019

(54) FAULTY CORE RECOVERY MECHANISMS FOR A THREE-DIMENSIONAL NETWORK ON A PROCESSOR ARRAY

(71) Applicant: International Business Machines Corporation, Armonk, NY (US)

(72) Inventors: Rodrigo Alvarez-Icaza Rivera, San Jose, CA (US); John V. Arthur, Mountain View, CA (US); John E. Barth, Jr., Williston, VT (US); Andrew S. Cassidy, San Jose, CA (US); Subramanian Iyer, Mount Kisco, NY (US); Paul A. Merolla, Palo Alto, CA (US); Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 15/135,444

(22) Filed: Apr. 21, 2016

(65) Prior Publication Data

US 2016/0239393 A1    Aug. 18, 2016

Related U.S. Application Data

(63) Continuation of application No. 14/819,742, filed on Aug. 6, 2015, now Pat. No. 9,363,137, which is a
(Continued)

(51) Int. Cl.
*G06F 11/20* (2006.01)
*H04L 12/24* (2006.01)
(Continued)

(52) U.S. Cl.
CPC ........ *G06F 11/2033* (2013.01); *G06F 11/165* (2013.01); *G06F 15/803* (2013.01);
(Continued)

(58) Field of Classification Search
CPC .. G06F 11/2033; G06F 11/165; G06F 15/803; G06F 2201/845; H04L 41/0654;
(Continued)

(56) References Cited

U.S. PATENT DOCUMENTS 5,065,308 A    11/1991   Evans
5,748,872 A     5/1998   Norman
(Continued)

FOREIGN PATENT DOCUMENTS

CN    101335606 A    12/2008
WO    2011003121 A1   1/2011

OTHER PUBLICATIONS

Fick, D. et al., "VICIS: A Reliable Network for Unreliable Silicon", Proceedings of the 46th Annual ACM/IEEE Design Automation Conference (DAC '09), 2009, pp. 812-817, ACM, USA.

(Continued)

*Primary Examiner* — Melvin C Marcelo
(74) *Attorney, Agent, or Firm* — Sherman IP LLP; Kenneth L. Sherman; Hemavathy Perumal

(57) ABSTRACT

Embodiments of the invention relate to faulty recovery mechanisms for a three-dimensional (3-D) network on a processor array. One embodiment comprises a multidimensional switch network for a processor array. The switch network comprises multiple switches for routing packets between multiple core circuits of the processor array. The switches are organized into multiple planes. The switch network further comprises a redundant plane including multiple redundant switches. Multiple data paths interconnect the switches. The redundant plane is used to facilitate full operation of the processor array in the event of one or more component failures.

20 Claims, 29 Drawing Sheets

Related U.S. Application Data continuation of application No. 13/631,544, filed on Sep. 28, 2012, now Pat. No. 9,160,617.

(51) Int. Cl.
*G06F 15/80* (2006.01)
*H04L 12/933* (2013.01)
*H04L 12/939* (2013.01)
*G06F 11/16* (2006.01)

(52) U.S. Cl.
CPC ...... *H04L 41/0654* (2013.01); *H04L 49/1523* (2013.01); *H04L 49/552* (2013.01); *G06F 2201/845* (2013.01); *H04L 49/101* (2013.01); *H04L 49/557* (2013.01)

(58) Field of Classification Search
CPC . H04L 49/1523; H04L 49/552; H04L 49/101; H04L 49/557
See application file for complete search history.

(56) References Cited

U.S. PATENT DOCUMENTS

| | | | |
|---|---|---|---|
| 6,408,402 B1 | 6/2002 | Norman | |
| 6,530,071 B1 | 3/2003 | Guccione et al. | |
| 6,681,316 B1 | 1/2004 | Clermidy et al. | |
| 6,826,709 B1 | 11/2004 | Clermidy et al. | |
| 7,000,033 B2 | 2/2006 | Lee | |
| 7,549,081 B2 | 6/2009 | Robbins et al. | |
| 7,711,977 B2 | 5/2010 | Ballew et al. | |
| 7,743,285 B1 | 6/2010 | Aggarwal et al. | |
| 7,804,504 B1 | 9/2010 | Agarwal | |
| 7,928,763 B2 | 4/2011 | Vorbach | |
| 8,001,280 B2 | 8/2011 | Blumrich et al. | |
| 8,018,849 B1 | 9/2011 | Wentzlaff | |
| 8,112,612 B2 | 2/2012 | Doerr et al. | |
| 8,156,311 B2 | 4/2012 | Pechanek | |
| 8,319,542 B2 | 11/2012 | Tamura et al. | |
| 8,635,378 B1 | 1/2014 | Wentzlaff | |
| 2006/0176075 A1* | 8/2006 | Or-Bach | G06F 17/5054 326/38 |
| 2008/0163255 A1 | 7/2008 | Munoz et al. | |
| 2011/0302450 A1 | 12/2011 | Hickey et al. | |
| 2014/0095923 A1 | 4/2014 | Alvarez-Icaza Rivera et al. | |

OTHER PUBLICATIONS

"Neishaburi, M.H. et al., ""ERAVC: Enhanced Reliability Aware NoC Router"", Proceedings of the 2011 12thInternational Symposium on Quality Electronic Design (ISQED '11), 2011, pp. 1-6, IEEE, USA".
U.S. Non-Final Office Action for U.S. Appl. No. 13/631,496 dated Jun. 24, 2014.
U.S. Final Office Action for U.S. Appl. No. 13/631,496 dated Oct. 10, 2014.
U.S. Notice of Allowance for U.S. Appl. No. 13/631,496 dated Nov. 12, 2014.
U.S. Non-Final Office Action for U.S. Appl. No. 13/631,544 dated Nov. 17, 2014.
U.S. Final Office Action for U.S. Appl. No. 13/631,544 dated Feb. 9, 2015.
U.S. Advisory Action for U.S. Appl. No. 13/631,544 dated Apr. 28, 2015.
U.S. Notice of Allowance for U.S. Appl. No. 13/631,544 dated Jun. 3, 2015.
U.S. Non-Final Office Action for U.S. Appl. No. 14/819,742 dated Oct. 8, 2015.
U.S. Notice of Allowance for U.S. Appl. No. 14/819,742 dated Feb. 24, 2016.

* cited by examiner

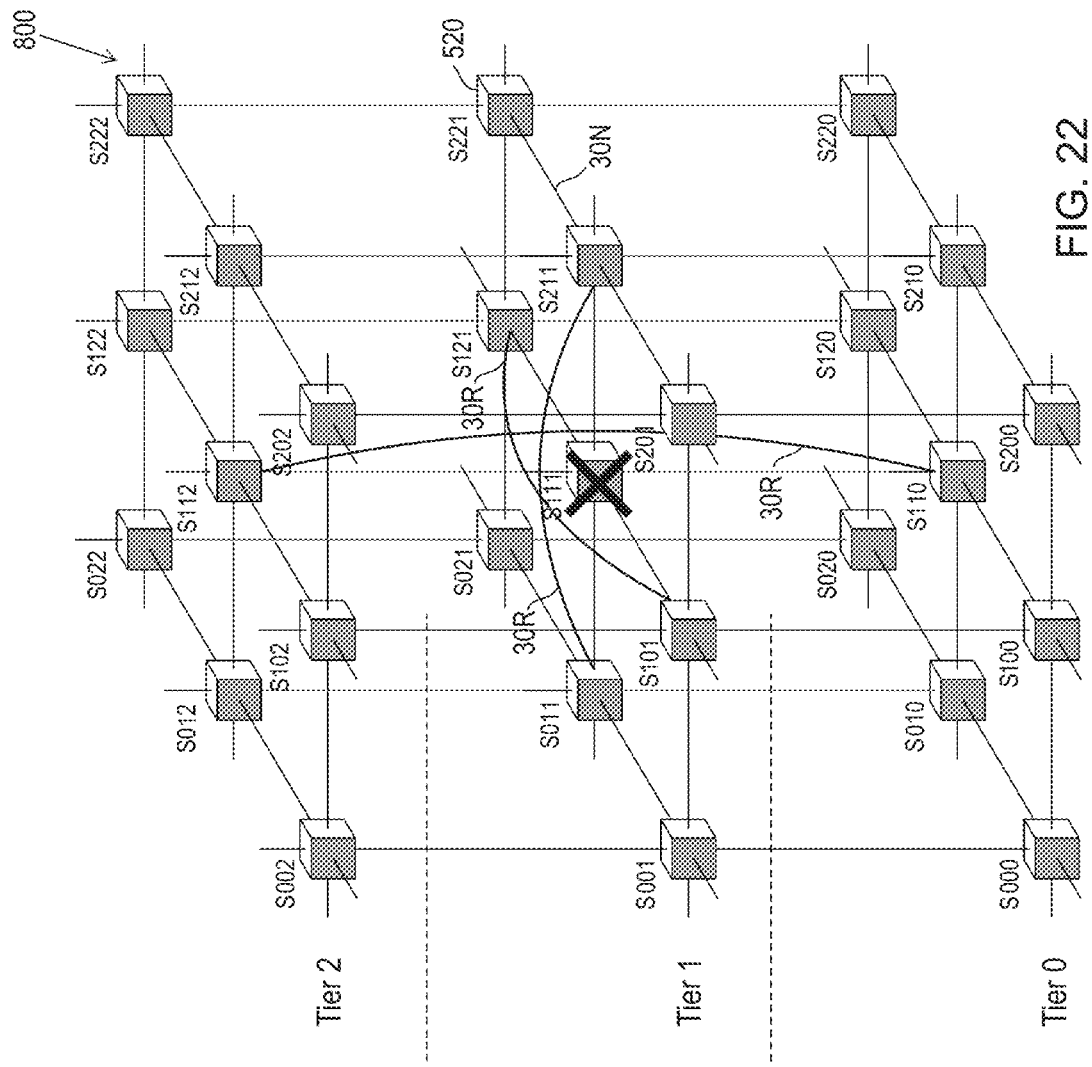

FAULTY CORE RECOVERY MECHANISMS FOR A THREE-DIMENSIONAL NETWORK ON A PROCESSOR ARRAY

This invention was made with Government support under HR0011-09-C-0002 awarded by Defense Advanced Research Projects Agency (DARPA). The Government has certain rights in this invention.

BACKGROUND

Embodiments of the invention relate to redundant routing systems, and in particular, faulty recovery mechanisms for a three-dimensional (3-D) network on a processor array.

A processor array contains and manages multiple processing elements. There are different types of processing elements, such as microprocessors, microcontrollers, digital signal processors, graphics processors, reconfigurable processors, fixed function units, hardware accelerators, neurosynaptic neural core circuits, etc. A processor array may include different types of processing elements. The processing elements may be arranged in a one-dimensional array, a two-dimensional array, or a three-dimensional array, or a ring or torus topology. The processing elements are interconnected by a routing system including buses and switches. Packets are communicated between processing elements using the routing system.

BRIEF SUMMARY

Embodiments of the invention relate to faulty recovery mechanisms for a three-dimensional (3-D) network on a processor array. One embodiment comprises a multidimensional switch network for a processor array. The switch network comprises multiple switches for routing packets between multiple core circuits of the processor array. The switches are organized into multiple planes. The switch network further comprises a redundant plane including multiple redundant switches. Multiple data paths interconnect the switches. The redundant plane is used to facilitate full operation of the processor array in the event of one or more component failures.

Another embodiment comprises routing packets between multiple core circuits of a processor array via multiple switches. The switches are organized into multiple planes. The switches are interconnected via multiple data paths. The data paths include at least one redundant data path for bypassing at least one component failure of the processor array.

These and other features, aspects and advantages of the present invention will become understood with reference to the following description, appended claims and accompanying figures.

BRIEF DESCRIPTION OF THE SEVERAL VIEWS OF THE DRAWINGS

FIG. 22 illustrates an example redundant routing system for a 3-D processor array, wherein the routing system includes only redundant data paths, in accordance with an embodiment of the invention;

DETAILED DESCRIPTION

Embodiments of the invention relate to faulty recovery mechanisms for a three-dimensional (3-D) network on a processor array. One embodiment comprises a multidimensional switch network for a processor array. The switch network comprises multiple switches for routing packets between multiple core circuits of the processor array. The switches are organized into multiple planes. The switch network further comprises a redundant plane including multiple redundant switches. Multiple data paths interconnect the switches. The redundant plane is used to facilitate full operation of the processor array in the event of one or more component failures.

Another embodiment comprises routing packets between multiple core circuits of a processor array via multiple switches. The switches are organized into multiple planes. The switches are interconnected via multiple data paths. The data paths include at least one redundant data path for bypassing at least one component failure of the processor array.

Figure 1:
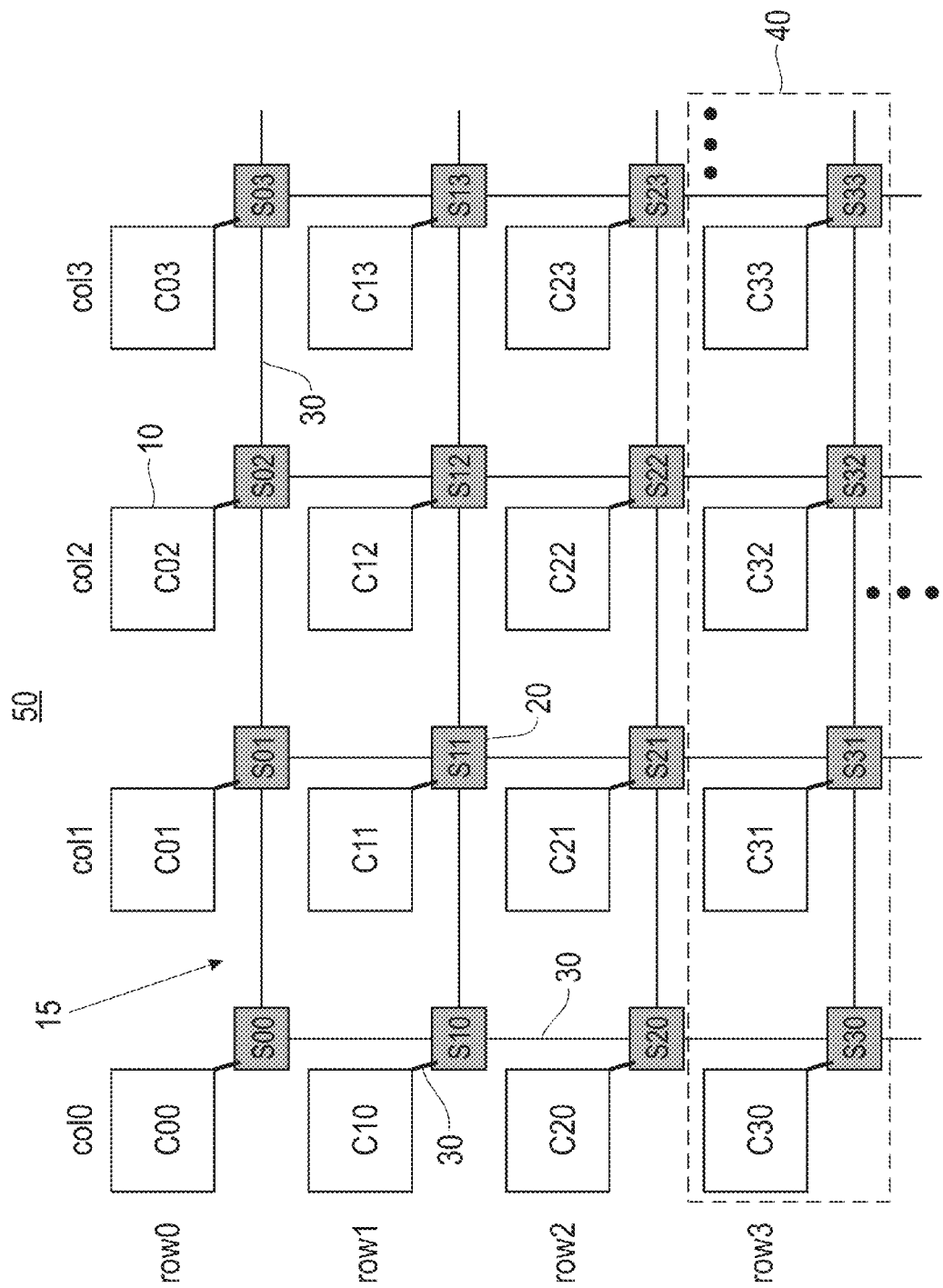
FIG. 1 illustrates a processor array, in accordance with an embodiment of the invention.

FIG. 1 illustrates a processor array 50, in accordance with an embodiment of the invention. The array 50 comprises multiple processor core circuits 10. Each processor core circuit 10 is a processing element for executing and generating data (e.g., instructions). Each processor core circuit 10 has a corresponding physical label. For example, as shown in FIG. 1, some of the core circuits 10 of the array 50 have physical labels that identify said core circuits 10 as core circuits C00, C01, C02, C03, C10, C11, C12, C13, C20, C21, C22, C23, C30, C31, C32, and C33.

Figure 3:
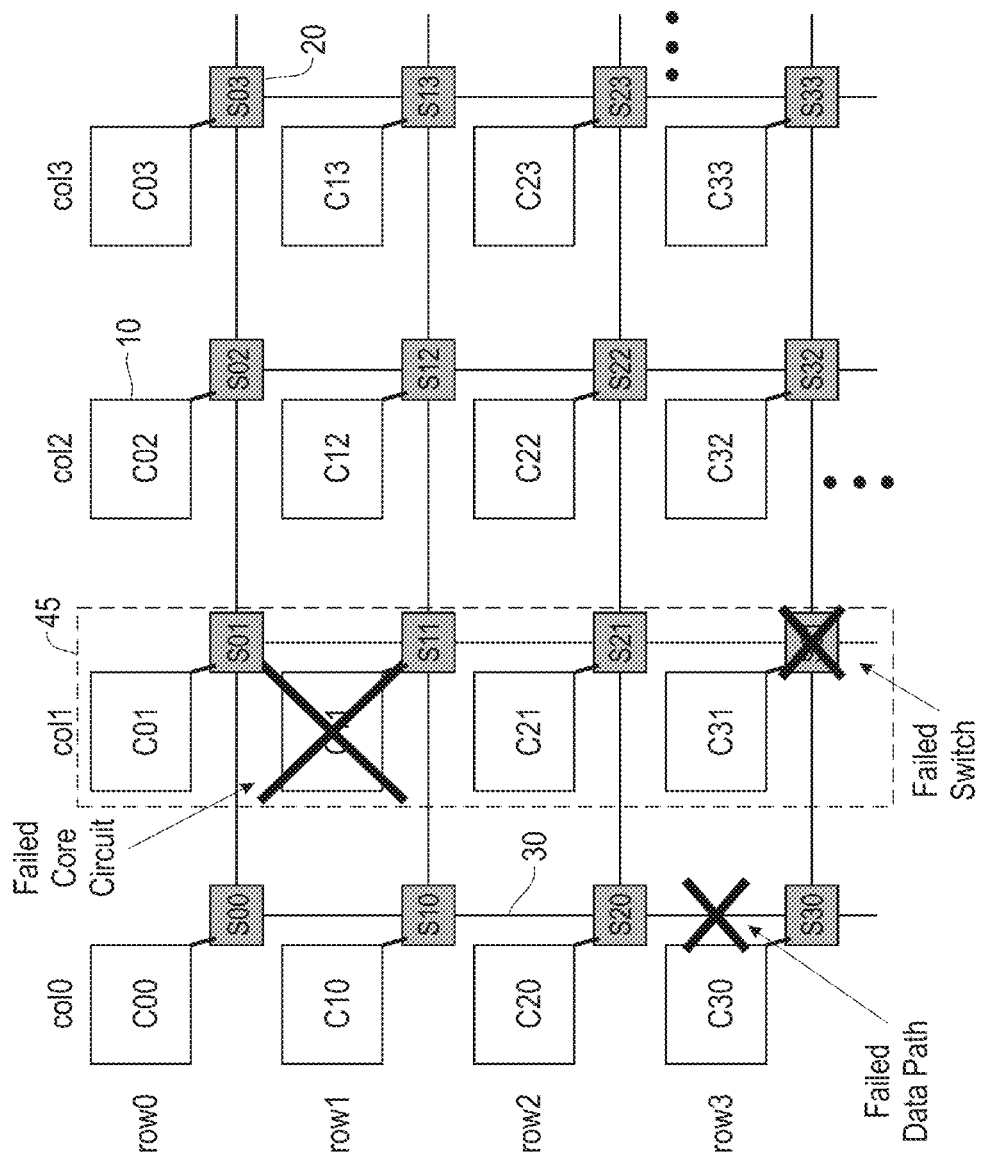
FIG. 3 illustrates example component failures of a processor array, in accordance with an embodiment of the invention.

The core circuits 10 may be organized into a one-dimensional (1-D) array, a two-dimensional (2-D) array, a three-dimensional (3-D) array, or a ring or torus topology. In one embodiment, the core circuits 10 are arranged into a two-dimensional array including multiple rows 40 and multiple columns 45 (FIG. 3). For example, the array 50 may be an M×N array, wherein M and N are integers greater than zero.

The array 50 further comprises a routing system 15 for routing packets between the core circuits 10. The routing system 15 includes multiple switches (i.e., routers) 20 and multiple data paths (i.e., buses) 30. Each switch 20 corresponds to one or more core circuits 10.

For example, as shown in FIG. 1, the routing system 15 includes switches S00, S01, S02, S03, S10, S11, S12, S13, S20, S21, S22, S23, S30, S31, S32, and S33. Each switch 20 in FIG. 1 corresponds to one core circuit 10. Switches S00, S01, S02, S03, S10, S11, S12, S13, S20, S21, S22, S23, S30, S31, S32, and S33 correspond to core circuits C00, C01, C02, C03, C10, C11, C12, C13, C20, C21, C22, C23, C30, C31, C32, and C33, respectively.

Each switch 20 is interconnected with a corresponding core circuit 10 via at least one data path 30. Each switch 20 is further interconnected with at least one adjacent neighboring switch 20 via at least one data path 30. For example, as shown in FIG. 1, switch S00 is interconnected with corresponding core circuit C00, and adjacent neighboring switches S01 and S10. As another example, switch S21 is interconnected with corresponding core circuit C21, and adjacent neighboring switches S11, S20, S22, and S31.

Each core circuit 10 utilizes a corresponding switch 20 to pass along packets including information in the eastbound, westbound, northbound, or southbound direction. For example, a packet generated by core circuit C00 and targeting core circuit C33 may traverse switches S00, S01, S02, and S03 n the eastbound direction, and switches S13, S23, and S33 in the southbound direction to reach core circuit C33.

Figure 2:
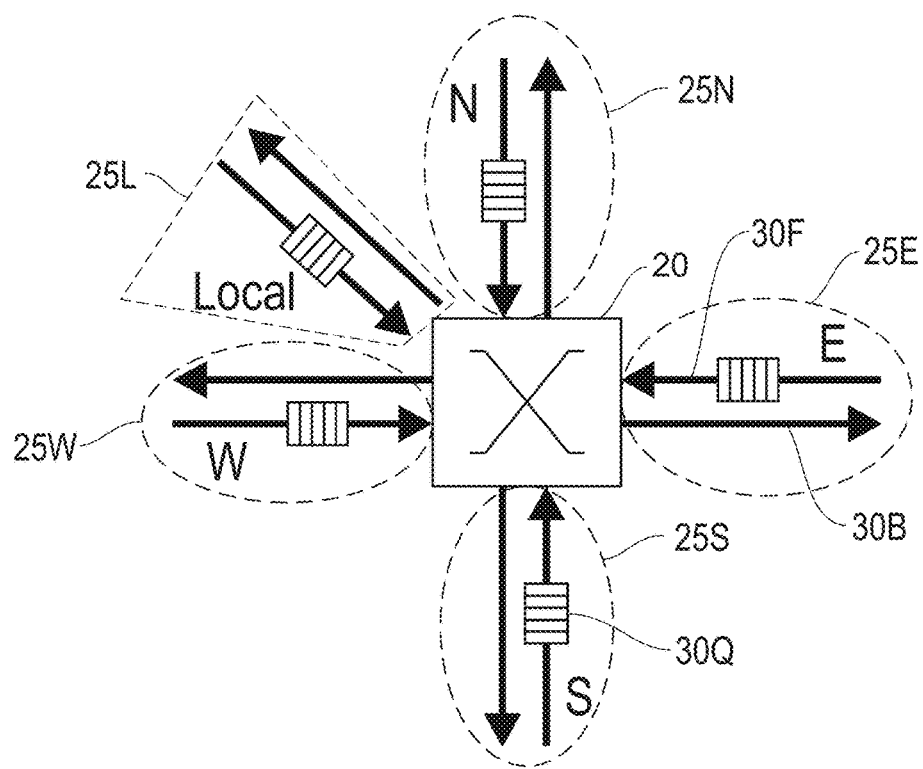
FIG. 2 illustrates an example configuration for a switch in FIG. 1, in accordance with an embodiment of the invention.

FIG. 2 illustrates an example configuration for a switch 20 in FIG. 1, in accordance with an embodiment of the invention. In one embodiment, multiple data paths 30 (FIG. 1) interconnect the switch 20 with neighboring components (i.e., a corresponding core circuit 10, neighboring switches 20).

Relative to a switch 20, each data path 30 is either an incoming router channel 30F or an outgoing router channel 30B. The switch 20 receives packets from a neighboring component via an incoming router channel 30F. The switch 20 sends packets to a neighboring component via an outgoing router channel 30B. Each incoming router channel 30F has a reciprocal outgoing router channel 30B. An incoming router channel 30F may have a buffer 30Q for maintaining incoming packets. In one embodiment, the incoming packets are maintained in a buffer 30Q in a First In, First Out (FIFO) fashion.

In one embodiment, the switch 20 exchanges packets with neighboring components via multiple sets of router channels, wherein each set of router channels has at least one incoming router channel 30F and at least one reciprocal router channel 30B. As shown in FIG. 2, a first set 25L of router channels ("Local router channels") interconnects the switch 20 with a corresponding core circuit 10. The switch 20 receives packets generated by the corresponding core circuit 10 via an incoming router channel 30F of the set 25L, and sends packets targeting the corresponding core circuit 10 via an outgoing router channel 30B of the set 25L.

A second set 25N of router channels ("North router channels") interconnects the switch 20 with an adjacent neighboring switch 20 to the north of the switch 20 ("north neighboring switch"). The switch 20 receives packets from the north neighboring switch 20 via an incoming router channel 30F of the set 25N, and sends packets to the north neighboring switch 20 via an outgoing router channel 30B of the set 25N.

A third set 25S of router channels ("South router channels") interconnects the switch 20 with an adjacent neighboring switch 20 to the south of the switch 20 ("south neighboring switch"). The switch 20 receives packets from the south neighboring switch 20 via an incoming router channel 30F of the set 25S, and sends packets to the south neighboring switch 20 via an outgoing router channel 30B of the set 25S.

A fourth set 25E of router channels ("East router channels") interconnects the switch 20 with an adjacent neighboring switch 20 to the east of the switch 20 ("east neighboring switch"). The switch 20 receives packets from the east neighboring switch 20 via an incoming router channel 30F of the set 25E, and sends packets to the east neighboring switch 20 via an outgoing router channel 30B of the set 25E.

A fifth set 25W of router channels ("West router channels") interconnects the switch 20 with an adjacent neighboring switch 20 to the west of the switch 20 ("west neighboring switch"). The switch 20 receives packets from the west neighboring switch 20 via an incoming router channel 30F of the set 25W, and sends packets to the west neighboring switch 20 via an outgoing router channel 30B of the set 25W.

For example, referring back to FIG. 1, switch S21 is interconnected with corresponding core circuit C21, and adjacent neighboring switches S11, S20, S22, and S31. Switch 21 exchanges packets with core circuit C21, north neighboring switch S11, south neighboring switch S31, east neighboring switch S22, and west neighboring switch S20 via a set 25L of router channels, a set 25N of router channels, a set 25S of router channels, a set 25E of router channels, and a set 25W of router channels, respectively.

FIG. 3 illustrates example component failures of a processor array 50, in accordance with an embodiment of the invention. A component failure occurs when the component is faulty. In the case of the array 50, a component failure may be any one of the following: a failed core circuit 10, a failed data path 30, or a failed switch 20. For example, in FIG. 3, core circuit C11 is a failed core circuit 10, switch S31 is a failed switch 20, and a data path 30 interconnecting switches S20 and S30 is a failed data path 30.

In this specification, a column 45 including at least one failed core circuit 10 is generally referred to as a failed column. As shown in FIG. 3, col1 is a failed column 45.

Embodiments of the invention provide a redundant routing system for a processor array. The different redundancy granularities disclosed herein include the ability to bypass a single failed core circuit 10, a block of one or more failed core circuits 10, a row of one or more failed core circuits 10, a column of one or more failed core circuits 10, or a plane of one or more failed core circuits 10.

Figure 4:
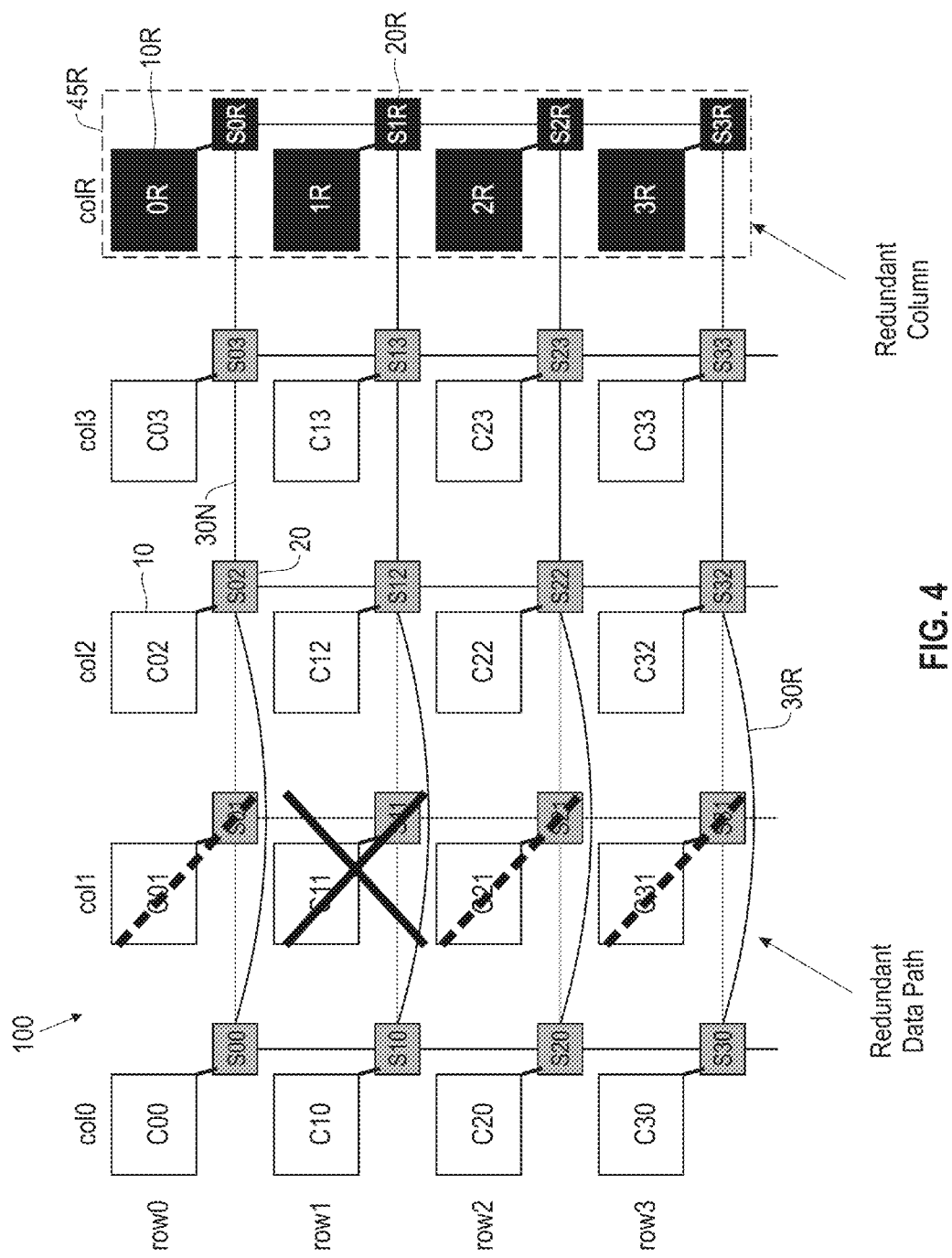
FIG. 4 illustrates an example redundant routing system for a processor array, wherein the routing system includes redundant data paths and a redundant column of redundant core circuits, in accordance with an embodiment of the invention.

FIG. 4 illustrates an example redundant routing system 100 for a processor array 50, wherein the routing system 100 includes redundant data paths 30R and a redundant column 45R of redundant core circuits 10R, in accordance with an embodiment of the invention. In one embodiment, the array 50 (FIG. 1) comprises a redundant routing system 100 for bypassing a component failure and facilitating full operation of the array 50. The redundant routing system 100 includes all components of the routing system 15 as described above and illustrated in FIG. 1.

The redundant routing system 100 further comprises additional data paths 30 (FIG. 1). In the redundant routing system 100, a data path 30 that interconnects switches 20 is either a normal data path 30N or a redundant data path 30R. A normal data path 30N interconnects adjacent neighboring switches 20 (e.g., a data path 30N interconnecting switch S01 with adjacent neighboring switch S02). By comparison, a redundant data path 30R interconnects non-neighboring switches 20. Each redundant data path 30R provides an alternate pathway for routing around a component failure.

Redundant data paths 30R are present throughout the array 50. For ease of illustration, only enabled redundant data paths 30R (i.e., redundant data paths 30R that are enabled/selected for routing around a component failure) are shown in FIG. 4. As shown in FIG. 4, at least one redundant data path 30R interconnects switch S00 with switch S02, at least one redundant data path 30R interconnects switch S10 with switch S12, at least one redundant data path 30R interconnects switch S20 with switch S22, and at least one redundant data path 30R interconnects switch S30 with switch S32.

A switch 20 exchanges packets with adjacent neighboring switches 20 via normal data paths 30N. A switch 20 may also exchange packets with non-neighboring switches 20 via redundant data paths 30R. As shown in FIG. 4, each switch S00, S10, S20, and S30 may exchange packets with non-neighboring switch S02, S12, S22, and S32, respectively, via at least one redundant data path 30R.

The redundant routing system 100 further comprises additional core circuits 10, such as core circuits 10 having physical labels 0R, 1R, 2R, and 3R. These additional core circuits 10 are redundant core circuits 10R. The redundant routing system 100 further comprises additional switches 20, such as switches S0R, S1R, S2R, and S3R. These additional switches 20 are redundant switches 20R. Redundant switches S0R, S1R, S2R, and S3R correspond to redundant core circuits 0R, 1R, 2R, and 3R, respectively.

In one embodiment, the redundant core circuits 10R are organized into at least one redundant column 45R. A redundant column 45R may be disposed anywhere in the array 50. Each redundant column 45R is used to recover a failed column 45. The redundant routing system 100 recovers one failed column 45 per redundant column 45R.

In one embodiment, the maximum number of failed core circuits 10 that a redundant column 45R can recover is equal to M, where M is the number of rows 40 (FIG. 1) of array 50 (FIG. 1), provided that the failed core circuits 10 are in the same column. For example, if array 50 has only four rows 40, the maximum number of failed circuits 10 that a redundant column 45R may recover is four, provided that the failed core circuits 10 are in the same column.

As shown in FIG. 4, colR is a redundant column 45R, and col1 is a failed column 45 that includes a component failure. In one example, the component failure of col1 is the failed core circuit C11. In another example, the component failure of col1 is the failed switch S11. In yet another example, the component failure of col1 is a failed data path 30 interconnecting the switch S11 with a neighboring component. To facilitate full operation of the array 50, col1 is bypassed entirely using redundant data paths 30R. Each switch S00, S10, S20, and S30 of col0 exchanges packets with non-neighboring switch S02, S12, S22, and S32 of col2 instead of adjacent neighboring switch S01, S11, S21, and S31 of col1, respectively. Similarly, each switch S02, S12, S22, and S32 of col2 exchanges packets with non-neighboring switch S00, S10, S20, and S30 of col0 instead of adjacent neighboring switch S01, S11, S21, and S31 of col1, respectively. As such, switches S01, S11, S21 and S31 of col1 are not used to propagate packets.

Even though col1 is bypassed entirely, the redundant routing system 100 enables the array 50 to logically look like a complete M×N array. Specifically, colR provides a redundant column 45R that makes the array 50 a complete M×N array. In one example, the columns 45 with physical labels col0, col2, col3, and colR are logically mapped as columns 45 with logical labels col0, col1, col2, and col3, respectively.

Figure 5:
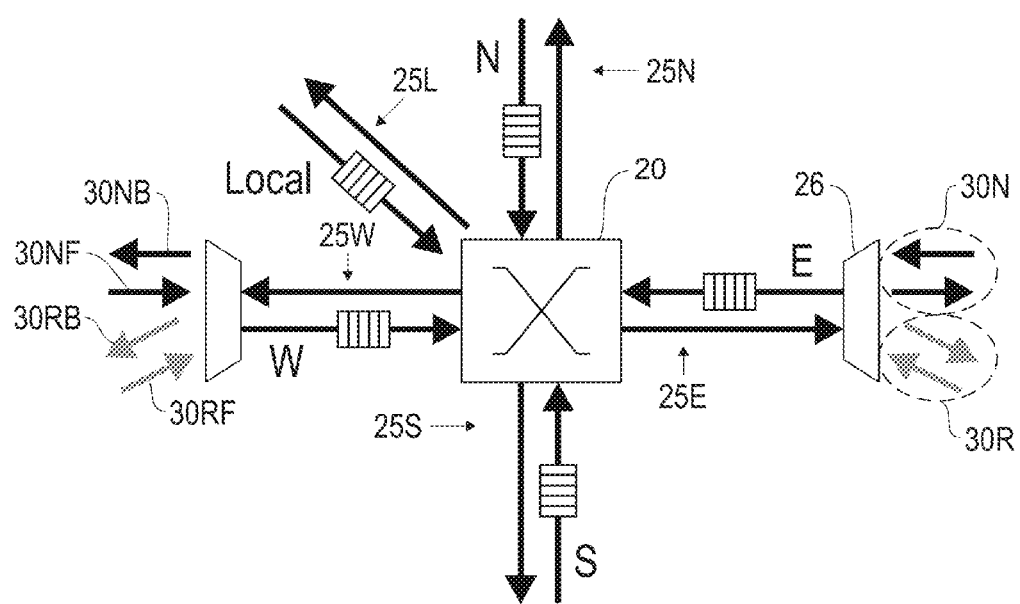
FIG. 5 illustrates an example configuration for a switch in FIG. 4, in accordance with an embodiment of the invention.

FIG. 5 illustrates an example configuration for a switch 20 in FIG. 4, in accordance with an embodiment of the invention. As described above and illustrated in FIG. 2, each switch 20 is connected to multiple sets of router channels, such as Local router channels 25L, North router channels 25N, South router channels 25S, East router channels 25E, and West router channels 25W.

Multiple static multiplexers 26 are used to select the switches 20 that the switch 20 exchanges packets with. Specifically, each static multiplexer 26 corresponds to only one set of router channels (e.g., Local router channels 25L, North router channels 25N, South router channels 25S, East router channels 25E, or West router channels 25W). Each static multiplexer 26 is used to select the type of data path 30 that a corresponding set of router channels should receive packets from/send packets to.

In one embodiment, a static multiplexer 26 is used to select either normal data paths 30N (that interconnect the switch 20 to an adjacent neighboring switch 20) or redundant data paths 30R (that interconnect the switch 20 with a non-neighboring switch 20). Relative to a switch 20, each normal data path 30N is either an incoming normal data path 30NF or an outgoing normal data path 30NB, and each redundant data path 30R is either an incoming redundant data path 30RF or an outgoing redundant data path 30RB.

As shown in FIG. 5, a first static multiplexer 26 is used to select the type of data paths 30 that East router channels 25E should receive packets from/send packets to. Specifically, the first static multiplexer 26 is used to select either normal data paths 30N that interconnect the switch 20 to an east neighboring switch 20, or redundant data paths 30R that interconnect the switch 20 to an east non-neighboring switch 20. For example, referring back to FIG. 4, switch S30 exchanges packets with either east neighboring switch S31 via normal data paths 30N, or east non-neighboring switch S32 via redundant data paths 30R.

Also shown in FIG. 5, a second static multiplexer 26 is used to select the type of data paths 30 that West router channels 25W should receive packets from/send packets to. Specifically, the second static multiplexer 26 is used to select either normal data paths 30N that interconnect the switch 20 to a west neighboring switch 20, or redundant data paths 30R that interconnect the switch 20 to a west non-neighboring switch 20. For example, referring back to FIG. 4, switch S32 exchanges packets with either west neighboring switch S31 via normal data paths 30N, or west non-neighboring switch S30 via redundant data paths 30R.

Figure 6:
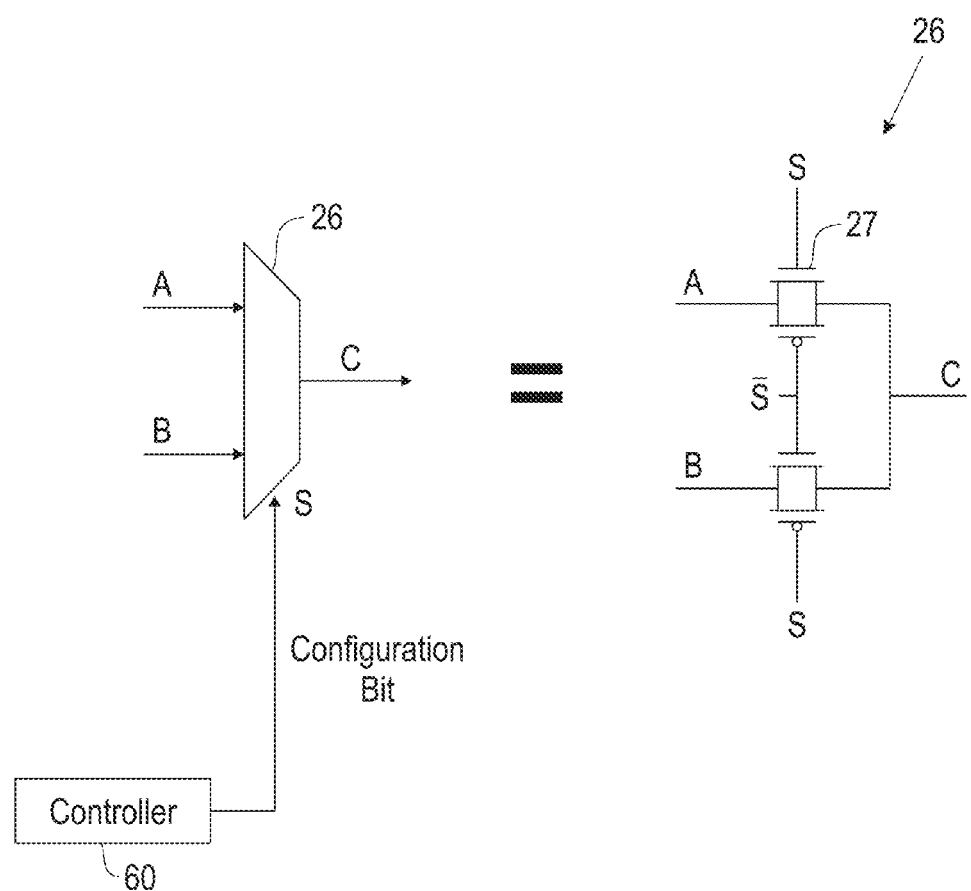
FIG. 6 illustrates a static multiplexer, in accordance with an embodiment of the invention.

FIG. 6 illustrates a static multiplexer 26, in accordance with an embodiment of the invention. The static multiplexer 26 is used to select the type of data path 30 that a corresponding set of router channels should receive packets from/send packets to. As shown in FIG. 6, the static multiplexer 26 selects between two different types of data paths, that is a first set of data paths A (e.g., normal data paths 30N) or a second set of data path B (e.g., redundant data paths 30R). A corresponding set of router channels C receives packets from/sends packets to the selected set of data paths 30.

A controller 60 is used to select the data paths 30. Specifically, a controller 60 provides a configuration bit to each static multiplexer 26. The configuration bit indicates whether redundancy mode for the array 50 is enabled or disabled. Each static multiplexer 26 selects the type of data path 30 based on the configuration bit received. For example, when the redundancy mode is enabled, redundant data paths (30R) are selected. When the redundancy mode is disabled, normal data paths (30N) are selected instead.

The controller 60 maintains a control register file. In one embodiment, one controller 60 is used for the entire array 50. In another embodiment, each switch 20 or each core circuit 10 has its own controller 60.

In one embodiment, the controller 60 sends a control packet including a configuration bit in-band to each static multiplexer 26. In another embodiment, the controller 60 sends a configuration bit out-of-band (e.g., via a separate communication channel, such as a scan chain or a dedicated bus) to each static multiplexer 26.

Component failures are detected by presenting test vectors. There may be a test vector for each core circuit 10, a test vector for each switch 20, and a test vector for each data path 30. For each test vector, the output generated based on said test vector is compared with expected output. A core circuit 10, a switch 20, or a data path 30 for a test vector is a component failure if the output generated based on the test vector does not equal the expected output. The controller 60 sets configuration bits that result in the bypass of the detected component failures.

Each data path 30 may include one signal wire or multiple signal wires (i.e., a bus of wires). A logic pass-gate may be used in the switching of a single signal wire. In one example implementation, each static multiplexer 26 is implemented using two logic pass-gates (i.e., four transistors 27) per signal wire of a data path 30. Other types of logic can also be used to implement the multiplexers 26.

Figure 8:
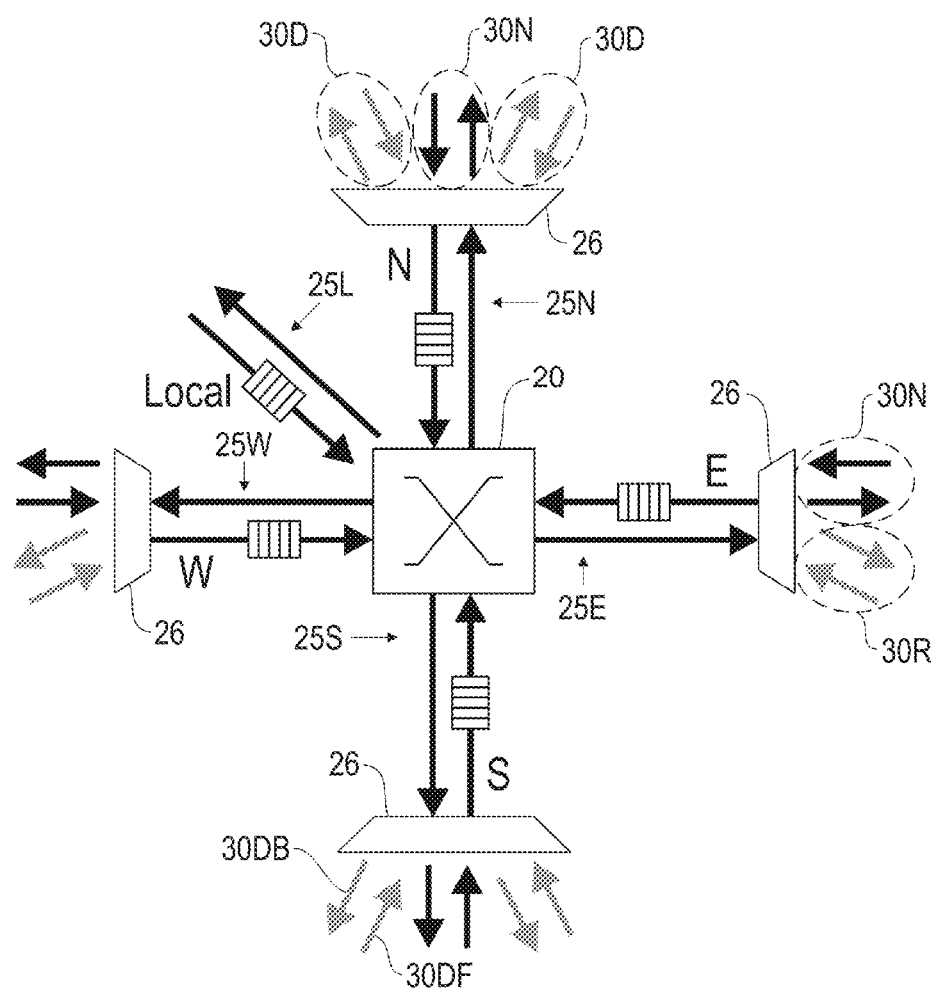
FIG. 8 illustrates an example configuration of a switch in FIG. 7, in accordance with an embodiment of the invention.

More than one configuration bit is required for a multiplexer 26 that is configured to select from more than two data paths 30 (see, for example, FIG. 8). In one example implementation, the number of configuration bits for a multiplexer 26 is equal to ceiling(log $2p$), wherein p is the total number of data paths 30 that said multiplexer 26 is configured to select from.

Figure 7:
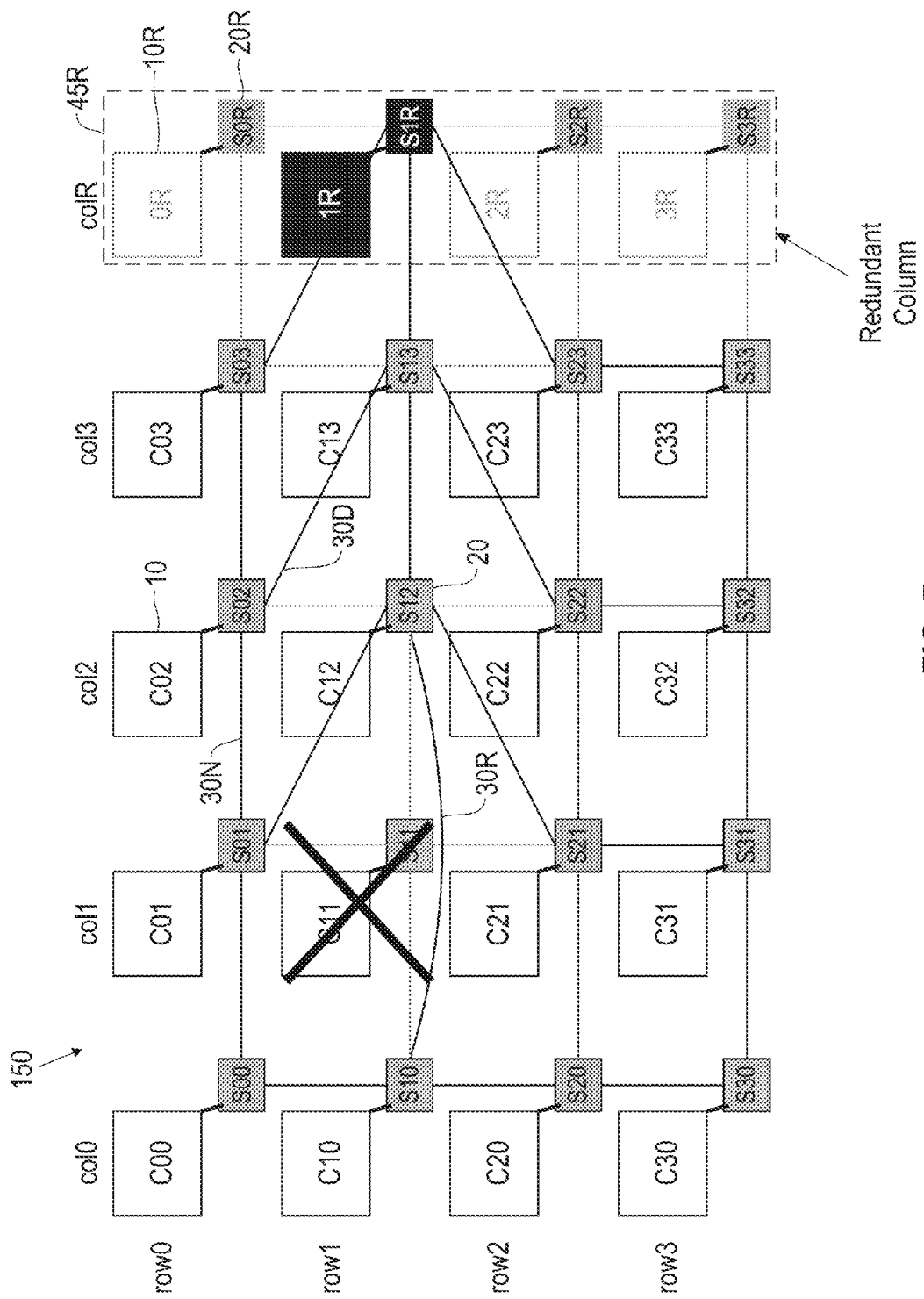
FIG. 7 illustrates an example redundant routing system for a processor array, wherein the routing system includes diagonal data paths and a redundant column of redundant core circuits, in accordance with an embodiment of the invention.

FIG. 7 illustrates an example redundant routing system 150 for a processor array 50, wherein the routing system 150 includes diagonal data paths 30D and a redundant column 45R of redundant core circuits 10R, in accordance with an embodiment of the invention. In another embodiment, the array 50 (FIG. 1) comprises a redundant routing system 150 for bypassing a component failure and facilitating full operation of the array 50. The redundant routing system 150 includes all components of the routing system 15 as described above and illustrated in FIG. 1.

The redundant routing system 150 further comprises redundant core circuits 10R, such as core circuits 0R, 1R, 2R, and 3R. The redundant routing system 150 further comprises redundant switches 20R, such as switches S0R, S1R, S2R, and S3R. Redundant switches S0R, S1R, S2R, and S3R correspond to redundant core circuits 0R, 1R, 2R, and 3R, respectively. In one embodiment, the redundant core circuits 10R are organized into at least one redundant column 45R.

The redundant routing system 150 further comprises additional data paths 30 (FIG. 1). In the redundant routing system 150, a data path 30 is a normal data path 30N, a redundant data path 30R, or a diagonal data path 30D. A diagonal data path 30D interconnects diagonally adjacent switches 20. Each diagonal data path 30D provides an alternate pathway for routing around a component failure.

Redundant data paths 30R and diagonal data paths 30D are present throughout the array 50. For ease of illustration, only enabled redundant data paths 30R and enabled diagonal data paths 30D (i.e., diagonal data paths 30D that are enabled/selected for routing around a component failure) are shown in FIG. 7. As shown in FIG. 7, diagonal data paths 30D interconnect switch S12 with switches S01 and S21, switch S13 with switches S02 and S22, and redundant switch S1R with switches S03 and S23. Further, at least one redundant data path 30R interconnects switch S10 with switch S12.

Each switch 20 exchanges packets with adjacent neighboring switches 20 via normal data paths 30N. Some switches 20 may also exchange packets with non-neighboring switches 20 via redundant data paths 30R. Some switches 20 may also exchange packets with diagonally adjacent switches 20 via diagonal data paths 30D. As shown in FIG. 7, each switch S12, S13, and S1R may exchange packets with diagonally adjacent switches S01 and S21, S02 and S22, and S03 and S23, respectively, via diagonal data paths 30D. For example, switch S12 may exchange packets with adjacent neighboring switches S02, S11, S13, and S22, non-neighboring switch S10, and diagonally adjacent switches S01 and S21.

The redundant routing system 150 recovers M failed core circuits 10 per redundant column 45R, wherein M is the number of rows 40 (FIG. 1) of array 50 (FIG. 1), and each failed core circuit 10 is in a different row 40, even if the failed core circuits 10 are in different columns. For example, if array 50 has only four rows 40, the maximum number of failed core circuits 10 that the array 50 can recover is four provided that the failed core circuits 10 are in different rows 40.

As shown in FIG. 7, colR is a redundant column 45R and col1 includes the failed core circuit C11. Even though failed core circuit C11 and corresponding switch S11 are bypassed entirely, the redundant routing system 150 enables the array 50 to logically look like a complete M×N array. For example, to facilitate full operation of the array 50, the core circuits 10 with physical labels C10, C12, C13, and C1R are logically mapped as core circuits 10 with logical labels C10, C11, C12, and C13, respectively. Switches S21, S22, and S23 exchange packets with switches S12, S13, and S1R, respectively using at least one diagonal data path 30D. Thus packets may arrive at the core circuits 10 with logical labels C11, C12, and C13 (i.e., physical labels C12, C13, and C1R) via diagonal data paths 30D.

One redundant core circuit 10R of colR, such as redundant core circuit 1R, is used to recover one failed core circuit C11. The remaining core circuits 10R of colR may be used to recover up to three additional failed core circuits 10 as long as the failed core circuits 10 are in different rows 40.

FIG. 8 illustrates an example configuration of a switch 20 in FIG. 7, in accordance with an embodiment of the invention. The switch 20 is connected to multiple sets of router channels, such as Local router channels 25L, North router channels 25N, South router channels 25S, East router channels 25E, and West router channels 25W. A first static multiplexer 26 is used to select the type of data paths 30 that East router channels 25E should receive packets from/send packets to. A second static multiplexer 26 is used to select the type of data paths 30 that West router channels 25W should receive packets from/send packets to.

As shown in FIG. 8, additional static multiplexers 26 are also used. In one embodiment, each additional static multiplexer 26 is used to select one of the following types of data paths: a set of normal data paths 30N that interconnect the switch 20 with an adjacent neighboring switch 20, a set of diagonal data paths 30D that interconnect the switch 20 with a diagonally adjacent switch 20 to the east of the switch 20, or a different set of diagonal data paths 30D that interconnect the switch 20 with a diagonally adjacent switch 20 to the west of the switch 20. Each set of diagonal data paths 30D includes an incoming diagonal data path 30DF and an outgoing diagonal data path 30DB.

As shown in FIG. 8, a third static multiplexer 26 is used to select the type of data paths 30 that North router channels 25N should receive packets from/send packets to. Specifically, the third static multiplexer 26 is used to select one of the following: a set of normal data paths 30N that interconnect the switch 20 to a north neighboring switch 20, a set of diagonal data paths 30D that interconnect the switch 20 to a north-east diagonally adjacent switch 20, and a different set of diagonal data paths 30D that interconnect the switch 20 to a north-west diagonally adjacent switch 20. For example, referring back to FIG. 7, switch S12 exchanges packets with either north-west diagonally adjacent switch S01 via a set of diagonal data paths 30D, or north neighboring switch S02 via a set of normal data paths 30N. Switch S12 may also exchange packets with north-east diagonally adjacent switch S03 via a set of diagonal data paths 30D that interconnects switch S12 with S03.

Also shown in FIG. 8, a fourth static multiplexer 26 is used to select the type of data paths 30 that South router channels 25S should receive packets from/send packets to. Specifically, the fourth static multiplexer 26 is used to select one of the following: a set of normal data paths 30N that interconnect the switch 20 to a south neighboring switch 20, a set of diagonal data paths 30D that interconnect the switch 20 to a south-east diagonally adjacent switch 20, and a different set of diagonal data paths 30D that interconnect the switch 20 to a south-west diagonally adjacent switch 20. For example, referring back to FIG. 8, switch S12 exchanges packets with either south-west diagonally adjacent switch S21 via a set of diagonal data paths 30D, or south neighboring switch S22 via a set of normal data paths 30N. Switch S12 may also exchange packets with south-east diagonally adjacent switch S23 via a set of diagonal data paths 30D that interconnect switch S12 with S23.

Figure 9:
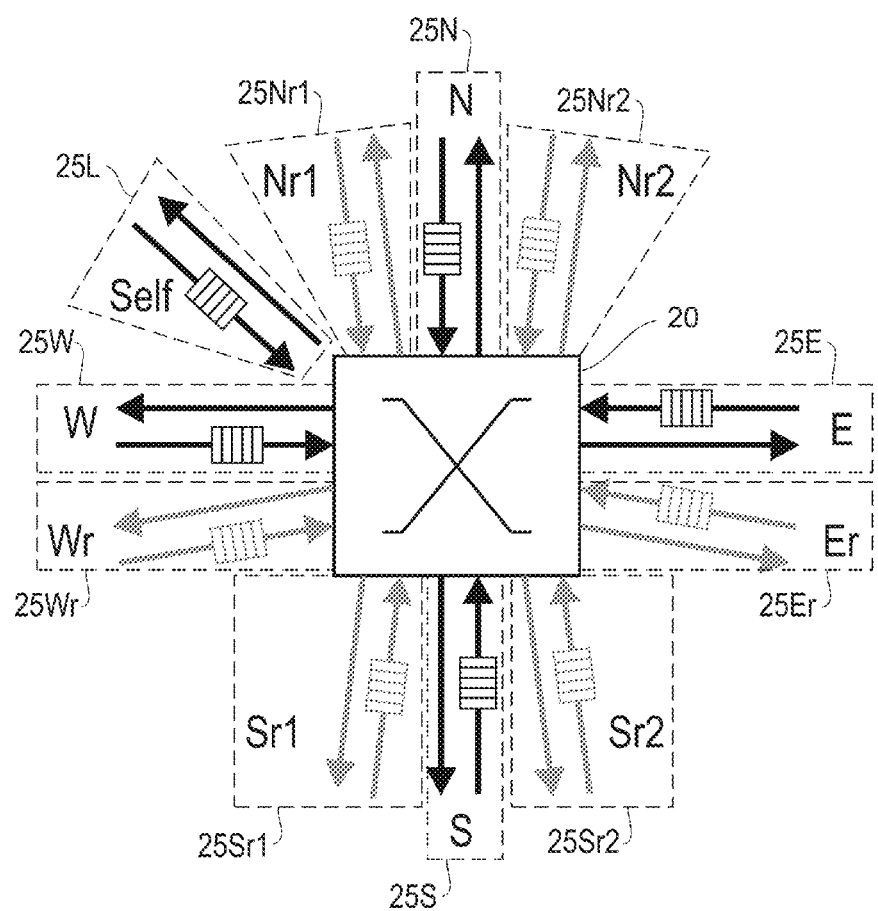
FIG. 9 illustrates another example configuration of a switch in FIG. 7, in accordance with an embodiment of the invention.

FIG. 9 illustrates another example configuration of a switch in FIG. 7, in accordance with an embodiment of the invention. The switch 20 is connected to multiple sets of router channels, such as Local router channels 25L, North router channels 25N, South router channels 25S, East router channels 25E, and West router channels 25W.

In another embodiment, multiple sets of redundant router channels (i.e., spare router channels) are used instead of static multiplexers 26. As shown in FIG. 9, a first set 25Nr1 interconnects the switch 20 with a north-west diagonally adjacent switch 20, a second set 25Nr2 interconnects the switch 20 with a north-east diagonally adjacent switch 20, a third set 25Sr1 interconnects the switch 20 with a south-west diagonally adjacent switch 20, a fourth set 25Sr2 interconnects the switch 20 with a south-east diagonally adjacent switch 20, a fifth set 25Er interconnects the switch 20 with an east non-neighboring switch 20, and a sixth set 25Wr interconnects the switch 20 with an west non-neighboring switch 20.

The controller 60 (FIG. 6) provides configuration bits to the switch 20. The switch 20 only uses router channels that are enabled. For each direction (i.e., North, South, East, and West), only one set of router channels is enabled. For example, in the South direction, only one set of router channels from the three sets 25Sr1, 25S, and 25Sr2 is enables, and the switch 20 exchanges packets using only the enabled set of router channels.

Figure 10:
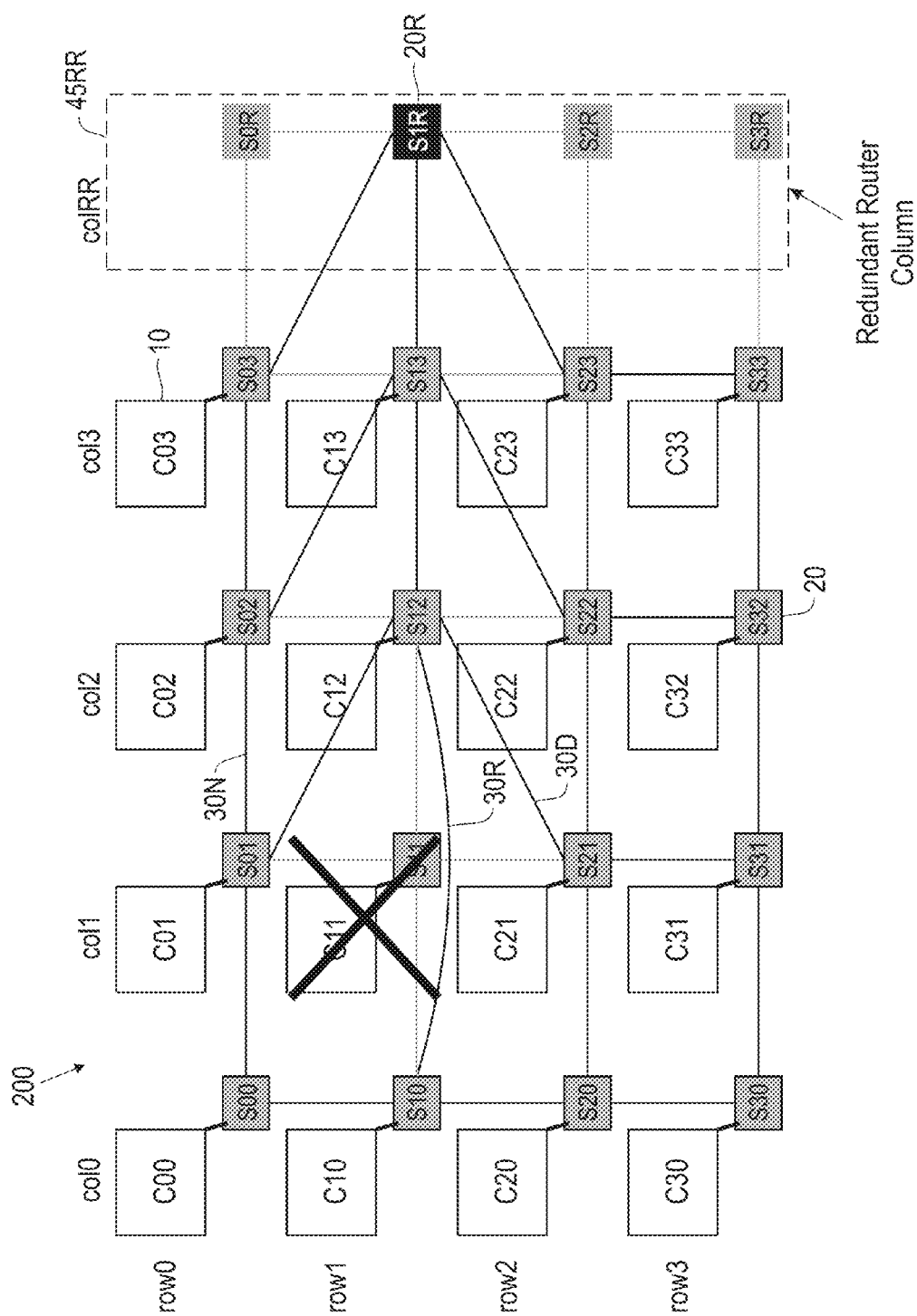
FIG. 10 illustrates an example redundant routing system for a processor array, wherein the routing system includes diagonal data paths and a redundant router column of redundant routers, in accordance with an embodiment of the invention.

FIG. 10 illustrates an example redundant routing system 200 for a processor array 50, wherein the routing system 200 includes diagonal data paths 30D and a redundant router column 45RR of redundant routers 20R, in accordance with an embodiment of the invention. In another embodiment, the array 50 (FIG. 1) comprises a redundant routing system 200 for bypassing a component failure and facilitating full operation of the array 50. The redundant routing system 200 includes all components of the routing system 15 as described above and illustrated in FIG. 1.

The redundant routing system 150 further comprises redundant switches 20R, such as switches S0R, S1R, S2R, and S3R. In one embodiment, the redundant switches 20R are organized into at least one redundant router column 45RR. Redundant router columns 45RR are positioned at an end of the array 50.

The redundant routing system 150 further comprises additional data paths 30 (FIG. 1). In the redundant routing system 200, a data path 30 is a normal data path 30N, a redundant data path 30R, or a diagonal data path 30D. Redundant data paths 30R and diagonal data paths 30D are present throughout the array 50. For ease of illustration, only enabled redundant data paths 30R and enabled diagonal data paths 30D are shown in FIG. 10. As shown in FIG. 10, diagonal data paths 30D interconnect switch S12 with switches S01 and S21, switch S13 with switches S02 and S22, and redundant switch S1R with switches S03 and S23. Further, at least one redundant data path 30R interconnects switch S10 with switch S12.

As shown in FIG. 10, colRR is a redundant router column 45RR. col1 includes at least one component failure. The component failure may be a failed core circuit C11, a failed switch S11, or a failed data path 30 interconnecting the switch S11 with a neighboring component. To facilitate full operation of the array 50, failed core circuit C11 and corresponding switch S11 are bypassed using diagonal data paths 30D and redundant data paths 30R.

Even though col1 includes at least one component failure, the redundant routing system 200 allows the array 50 to logically operate as a fully functionally M×N network array of switches 20. The redundant routing system 200 uses less area than the redundant routing system 150 of FIG. 7 because the redundant routing system 200 does not include redundant core circuits 10R. The redundant routing system 200 does not recover a failed core circuit 10. Software is used to migrate functionality from a failed core circuit 10 to another core circuit 10 of the array 50.

Figure 11:
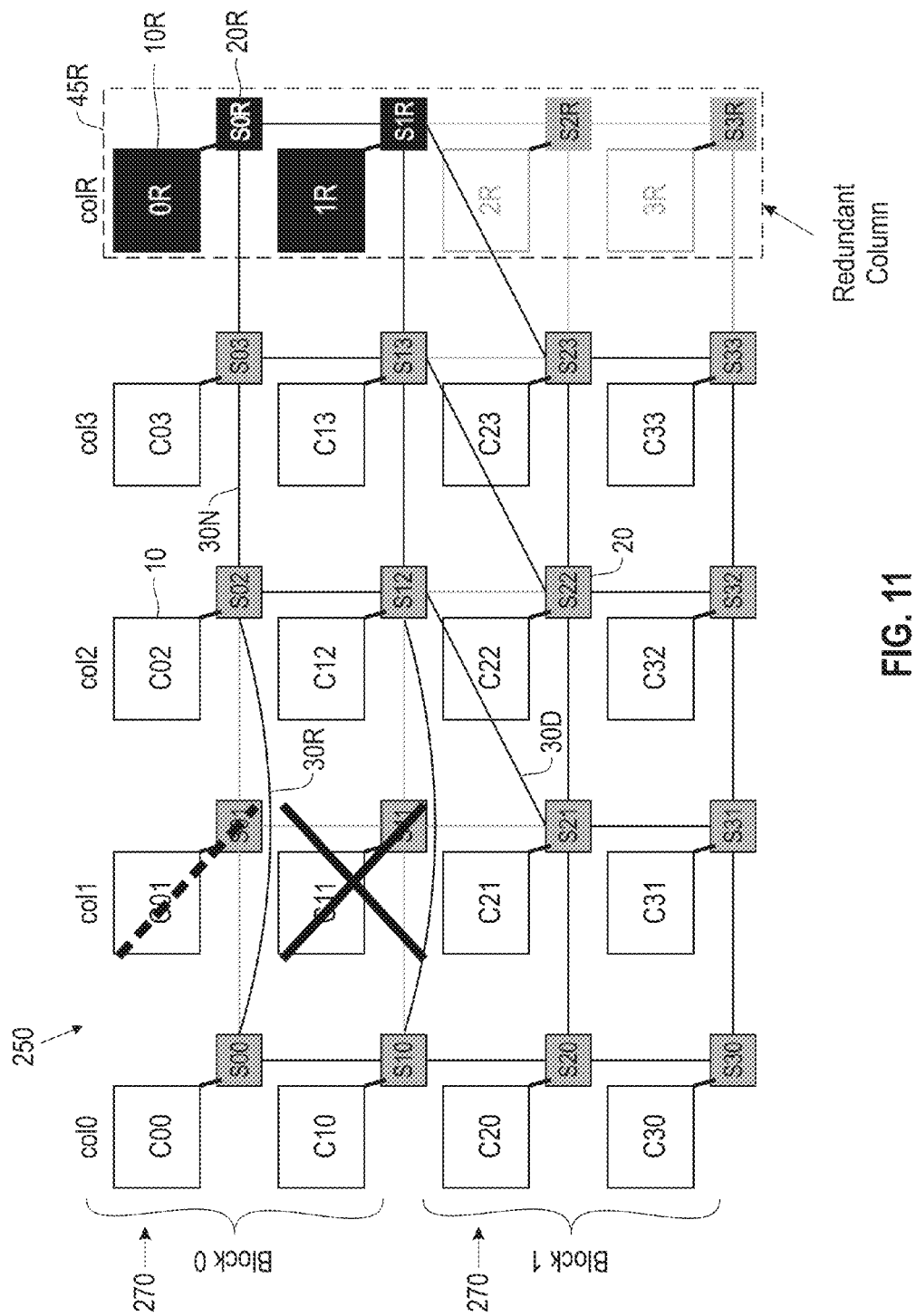
FIG. 11 illustrates an example redundant routing system for a processor array, wherein the routing system is organized into blocks, in accordance with an embodiment of the invention.

FIG. 11 illustrates an example redundant routing system 250 for a processor array 50, wherein the routing system 250 is organized into blocks, in accordance with an embodiment of the invention. In another embodiment, the array 50 (FIG. 1) comprises a redundant routing system 250 for bypassing a component failure and facilitating full operation of the array 50. The redundant routing system 250 includes all components of the routing system 15 as described above and illustrated in FIG. 1.

The redundant routing system 250 operates using a block-based approach. Components of the array 50 are organized into multiple blocks 270. The redundant routing system 250 further comprises redundant core circuits 10R, such as core circuits 0R, 1R, 2R, and 3R. The redundant routing system 250 further comprises redundant switches 20R, such as switches S0R, S1R, S2R, and S3R. Redundant switches S0R, S1R, S2R, and S3R correspond to redundant core circuits 0R, 1R, 2R, and 3R, respectively. In one embodiment, the redundant core circuits 10R are organized into at least one redundant column 45R.

The redundant routing system 250 further comprises additional data paths 30 (FIG. 1). In the redundant routing system 250, a data path 30 is a normal data path 30N, a redundant data path 30R, or a diagonal data path 30D. Redundant data paths 30R and diagonal data paths 30D are present throughout the array 50. For ease of illustration, only enabled redundant data paths 30R and enabled diagonal data paths 30D are shown in FIG. 11.

The redundant routing system 250 operates using a block-based approach. Components of the array 50 are organized into multiple blocks 270. The redundant routing system 250 recovers one failed core circuit 10 per block 270, per redundant column 45R. For each block 270 including a failed core circuit 10, redundant data paths 30R within said block 270 are used to bypass components of a column 45 within said block 270, wherein the column 45 includes the failed core circuit 10, and wherein the bypassed components are recovered used components of a redundant column 45R within said block 270. Packets are propagated between blocks 270 using diagonal data paths 30D.

As shown in FIG. 11, components of the array 50 are organized into multiple blocks 270, such as Block 0 and Block 1. Diagonal data paths 30D interconnect switches S12 and S13 with switches S21 and S22, respectively. Redundant data paths 30R interconnect switches S00 and S10 with switches S02 and S12, respectively. colR is a redundant column 45R and col1 includes the failed core circuit C11.

Components of col1 within Block 0 (i.e., core circuits C01 and C11, and switches S01 and S11) are entirely bypassed using redundant data paths 30R. Components of redundant column 45R within Block 0 (i.e., redundant core circuits 0R and 1R, and redundant switches S0R and S1R) are used to recover the bypassed components. Diagonal data paths 30D at the edges of Block 0 are used to propagate packets to components of the Block 1.

Figure 12A:
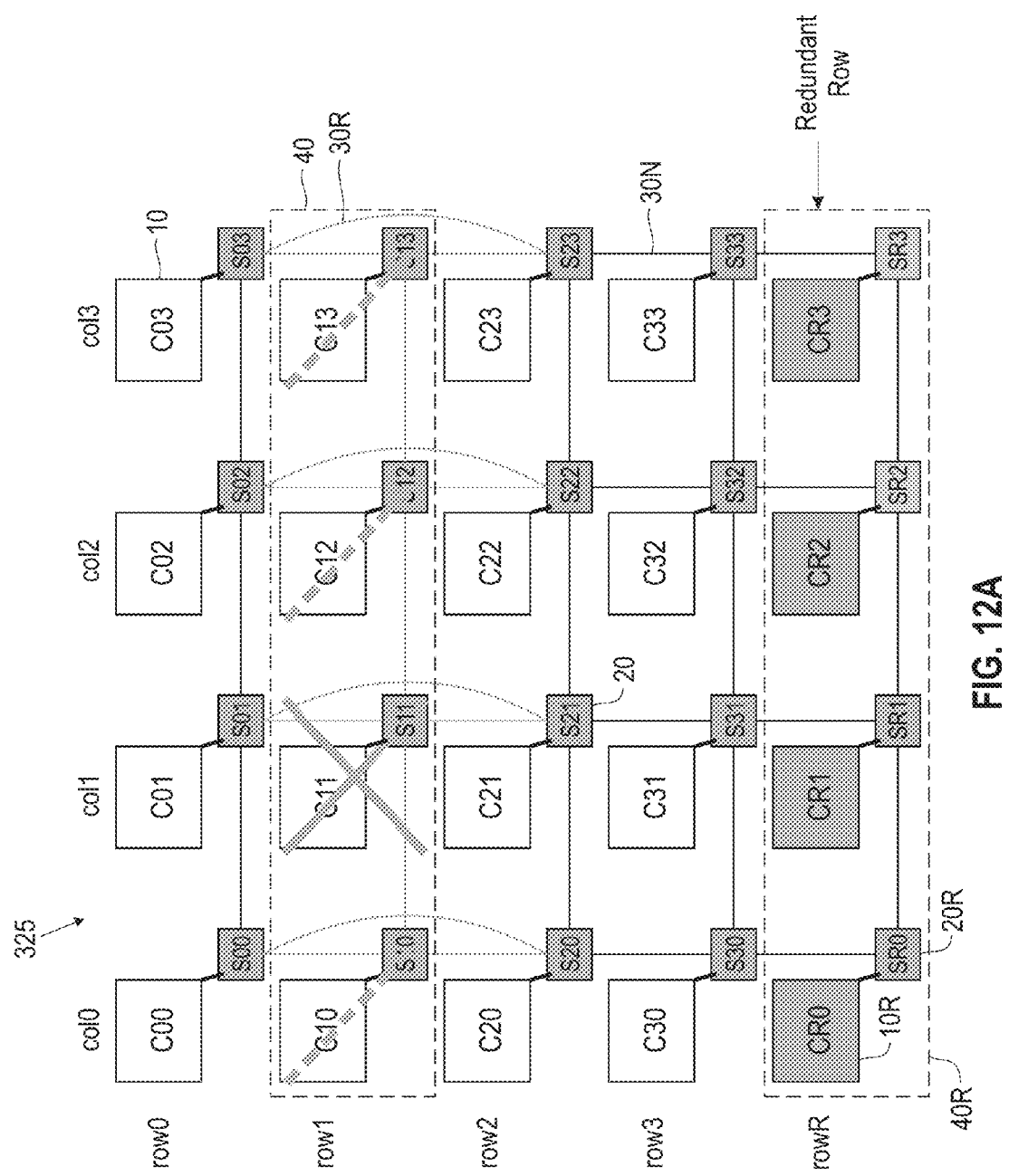
FIG. 12A illustrates an example redundant routing system for a processor array, wherein the routing system includes redundant data paths and a redundant row of redundant core circuits, in accordance with an embodiment of the invention.

FIG. 12A illustrates an example redundant routing system 325 for a processor array 50, wherein the routing system 325 includes redundant data paths 30R and a redundant row 40R of redundant core circuits 10R, in accordance with an embodiment of the invention. In one embodiment, the array 50 (FIG. 1) comprises a redundant routing system 325 for bypassing a component failure and facilitating full operation of the array 50. The redundant routing system 325 includes all components of the routing system 15 as described above and illustrated in FIG. 1.

The redundant routing system 325 further comprises additional data paths 30 (FIG. 1). In the redundant routing system 325, a data path 30 is either a normal data path 30N or a redundant data path 30R. Redundant data paths 30R are present throughout the array 50. For ease of illustration, only enabled redundant data paths 30R are shown in FIG. 12A. As shown in FIG. 12A, at least one redundant data path 30R interconnects switch S00 with switch S20, at least one redundant data path 30R interconnects switch S01 with switch S21, at least one redundant data path 30R interconnects switch S02 with switch S22, and at least one redundant data path 30R interconnects switch S03 with switch S23.

The redundant routing system 325 further comprises additional core circuits 10, such as core circuits R0, R1, R2, and R3. These additional core circuits 10 are redundant core circuits 10R. The redundant routing system 325 further comprises additional switches 20, such as switches SR0, SR1, SR2, and SR3. These additional switches 20 are redundant switches 20R. Redundant switches SR0, SR1, SR2, and SR3 correspond to redundant core circuits R0, R1, R2, and R3, respectively.

In one embodiment, the redundant core circuits 10R are organized into at least one redundant row 40R. Redundant rows 40R are disposed anywhere in the array 50. In this specification, a row 40 including at least one failed core circuit 10 is generally referred to as a failed row. Each redundant row 40R is used to recover a failed row 40. The redundant routing system 325 recovers one failed row 40 per redundant row 40R.

In one embodiment, the maximum number of failed core circuits 10 that a redundant row 40R may recover is equal to N, wherein N is the number of columns 45 (FIG. 1) of array 50 (FIG. 1), provided that the failed core circuits 10 are in the same row. For example, if array 50 has only four columns 45, the maximum number of failed core circuits 10 that a redundant row 40R can recover is four, provided that the failed core circuits 10 are in the same row.

As shown in FIG. 12A, rowR is a redundant row 40R, and row1 is a failed row 40 that includes the failed core circuit C11. To facilitate full operation of the array 50, row1 is bypassed entirely using redundant data paths 30R. Each switch S00, S01, S02, and S03 of row0 exchanges packets with non-neighboring switch S20, S21, S22, and S23 of row2 instead of adjacent neighboring switch S10, S11, S12, and S13 of row1, respectively. Similarly, each switch S20, S21, S22, and S23 of row2 exchanges packets with non-neighboring switch S00, S01, S02, and S03 of row0 instead of adjacent neighboring switch S10, S11, S12, and S13 of row1, respectively. As such, switches S10, S11, S12, and S13 of row1 are not used to propagate packets.

Even though row1 is bypassed entirely, the redundant routing system 325 enables the array 50 to logically operate as an M×N array. Specifically, rowR provides a redundant row 30R that enables the full operation of the array 50. In one example, the rows 40 with physical labels row0, row2, row3, and rowR are logically mapped as rows 40 with logical labels row0, row1, row2, and row3, respectively.

Figure 12B:
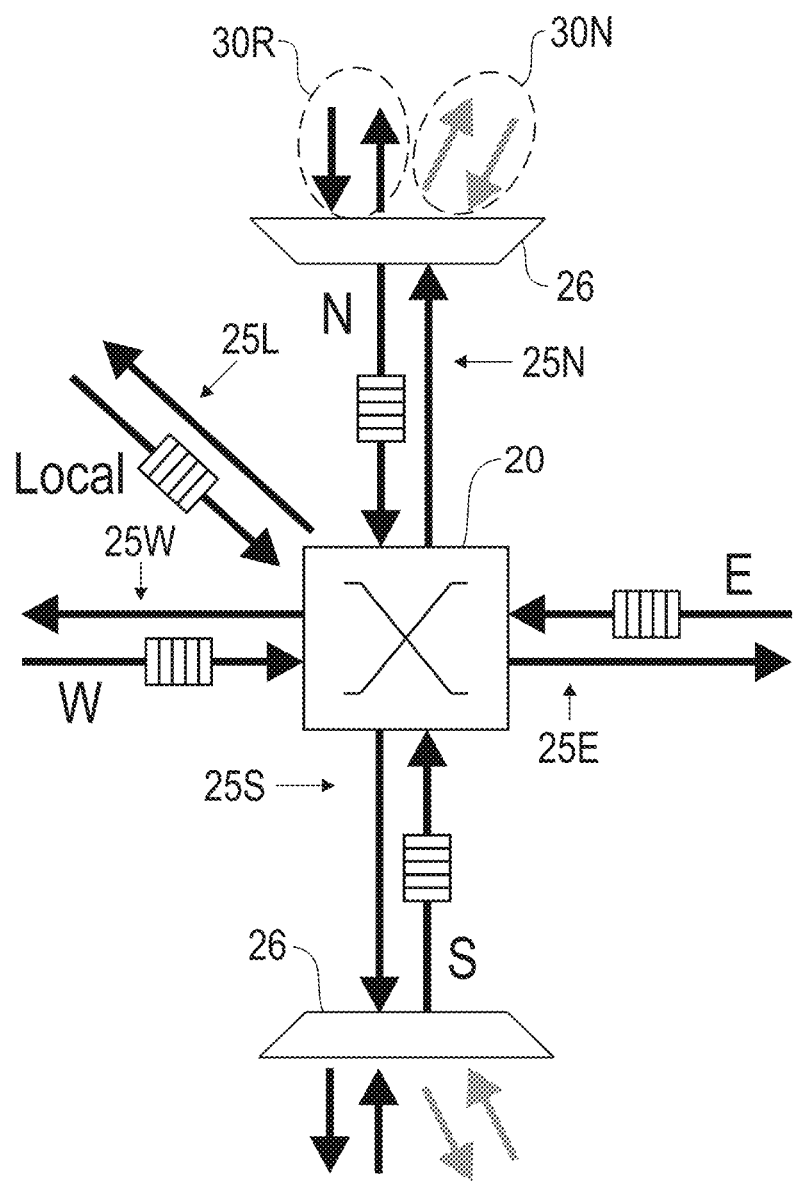
FIG. 12B illustrates an example configuration of a switch in FIG. 12A, in accordance with an embodiment of the invention.

FIG. 12B illustrates an example configuration of a switch 20 in FIG. 12A, in accordance with an embodiment of the invention. As described above and illustrated in FIG. 2, each switch 20 is connected to multiple sets of router channels, such as Local router channels 25L, North router channels 25N, South router channels 25S, East router channels 25E, and West router channels 25W.

As shown in FIG. 12B, a first static multiplexer 26 is used to select the type of data paths 30 that North router channels 25N should receive packets from/send packets to. Specifically, the first static multiplexer 26 is used to select either normal data paths 30N that interconnect the switch 20 to a north neighboring switch 20, or redundant data paths 30R that interconnect the switch 20 to a north non-neighboring switch 20. For example, referring back to FIG. 12A, switch S22 exchanges packets with either north neighboring switch S12 via normal data paths 30N, or north non-neighboring switch S03 via redundant data paths 30R.

Also shown in FIG. 12B, a second static multiplexer 26 is used to select the type of data paths 30 that South router channels 25S should receive packets from/send packets to. Specifically, the second static multiplexer 26 is used to select either normal data paths 30N that interconnect the switch 20 to a south neighboring switch 20, or redundant data paths 30R that interconnect the switch 20 to a south non-neighboring switch 20. For example, referring back to FIG. 12A, switch S02 exchanges packets with either south neighboring switch S12 via normal data paths 30N, or south non-neighboring switch S22 via redundant data paths 30R.

Figure 13:
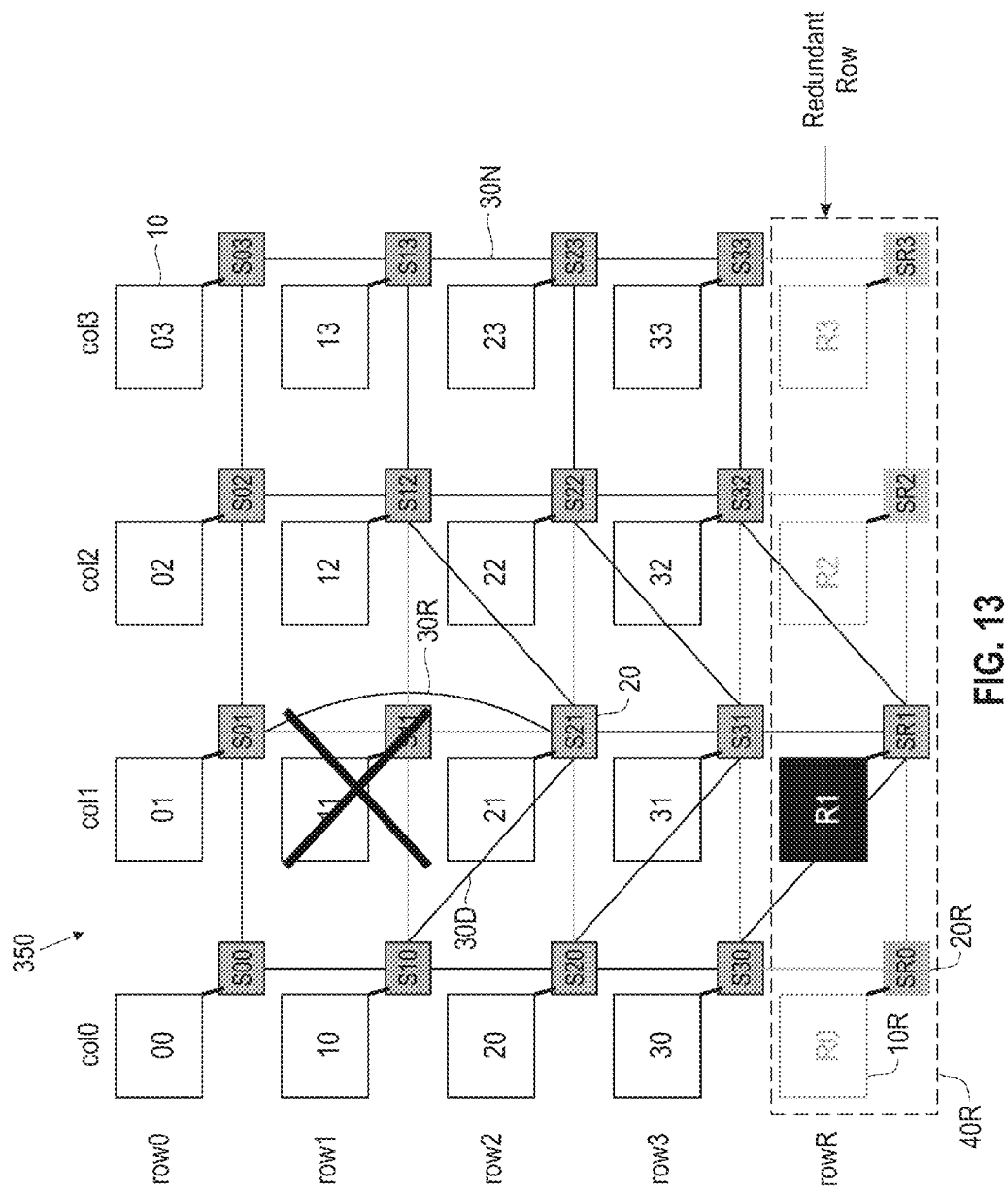
FIG. 13 illustrates an example redundant routing system for a processor array, wherein the routing system includes diagonal data paths and a redundant row of redundant core circuits 10R, in accordance with an embodiment of the invention.

FIG. 13 illustrates an example redundant routing system 350 for a processor array 50, wherein the routing system 350 includes diagonal data paths 30D and a redundant row 40R of redundant core circuits 10R, in accordance with an embodiment of the invention. In another embodiment, the array 50 (FIG. 1) comprises a redundant routing system 350 for bypassing a component failure and facilitating full operation of the array 50. The redundant routing system 350 includes all components of the routing system 15 as described above and illustrated in FIG. 1.

The redundant routing system 350 further comprises redundant core circuits 10R, such as core circuits R0, R1, R2, and R3. The redundant routing system 350 further comprises redundant switches 20R, such as switches SR0, SR1, SR2, and SR3. Redundant switches SR0, SR1, SR2, and SR3 correspond to redundant core circuits R0, R1, R2, and R3, respectively. In one embodiment, the redundant core circuits 10R are organized into at least one redundant row 40R.

The redundant routing system 350 further comprises additional data paths 30 (FIG. 1). In the redundant routing system 350, a data path 30 is a normal data path 30N, a redundant data path 30R, or a diagonal data path 30D. Redundant data paths 30R and diagonal data paths 30D are present throughout the array 50. For ease of illustration, only enabled redundant data paths 30R and enabled diagonal data paths 30D are shown in FIG. 13.

As shown in FIG. 13, diagonal data paths 30D interconnect switch S21 with switches S10 and S12, switch S31 with switches S20 and S22, and redundant switch SR1 with switches S30 and S32. Further, at least one redundant data path 30R interconnects switch S01 with switch S21. Each switch S21, S31, and SR1 may exchange packets with diagonally adjacent switches S10 and S12, S20 and S22, and S30 and S32, respectively, via diagonal data paths 30D. For example, switch S21 may exchange packets with adjacent neighboring switches S20, S11, S31, and S22, non-neighboring switch S01, and diagonally adjacent switches S10 and S12.

The redundant routing system 350 recovers N failed core circuits 10 per redundant row 40R, wherein N is the number of rows 40 (FIG. 1) of array 50 (FIG. 1), and each failed core circuit 10 is in a different column 45, even if the failed core circuits 10 are in different rows. For example, if array 50 has only four columns 45, the maximum number of failed core circuits 10 that the array 50 can recover is four provided that the failed core circuits 10 are in different columns 45.

As shown in FIG. 13, rowR is a redundant row 40R and row1 includes the failed core circuit C11. To facilitate full operation of the array 50, failed core circuit C11 and corresponding switch S11 are bypassed using diagonal data paths 30D and redundant data paths 30R. Switches S01 and S21 exchange packets via at least one redundant data path 30R, switches S10 and S21 exchange packets via at least one diagonal data path 30D, and switches S12 and S21 exchange packets via at least one diagonal data path 30D. As such, switch S11 is not used to propagate packets One redundant core circuit 10R of rowR, such as redundant core circuit R1, is used to recover failed core circuit C11. The remaining core circuits 10R of rowR may be used to recover up to three additional failed core circuits 10 as long as the failed core circuits 10 are in different columns 45.

Figure 14:
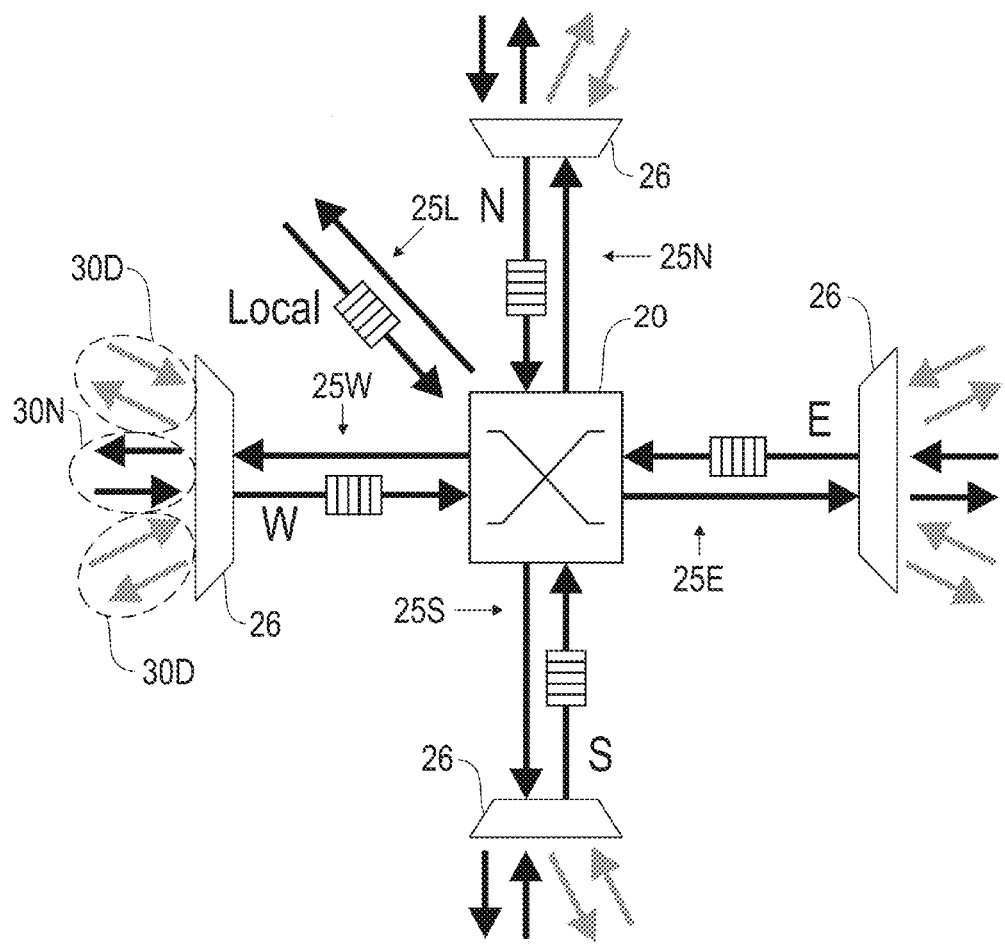
FIG. 14 illustrates an example configuration of a switch in FIG. 13, in accordance with an embodiment of the invention.

FIG. 14 illustrates an example configuration of a switch 20 in FIG. 13, in accordance with an embodiment of the invention. The switch 20 is connected to multiple sets of router channels, such as Local router channels 25L, North router channels 25N, South router channels 25S, East router channels 25E, and West router channels 25W. A first static multiplexer 26 is used to select the type of data paths 30 that North router channels 25N should receive packets from/send packets to. A second static multiplexer 26 is used to select the type of data paths 30 that South router channels 25S should receive packets from/send packets to.

As shown in FIG. 14, additional static multiplexers 26 are also used. In one embodiment, each additional static multiplexer 26 is used to select one of the following types of data paths: a set of normal data paths 30N that interconnect the switch 20 with an adjacent neighboring switch 20, a set of diagonal data paths 30D that interconnect the switch 20 with a diagonally adjacent switch 20 to the north of the switch 20, or a different set of diagonal data paths 30D that interconnect the switch 20 with a diagonally adjacent switch 20 to the south of the switch 20.

As shown in FIG. 14, a third static multiplexer 26 is used to select the type of data paths 30 that East router channels 25E should receive packets from/send packets to. Specifically, the third static multiplexer 26 is used to select one of the following: a set of normal data paths 30N that interconnect the switch 20 to an east neighboring switch 20, a set of diagonal data paths 30D that interconnect the switch 20 to a north-east diagonally adjacent switch 20, and a different set of diagonal data paths 30D that interconnect the switch 20 to a south-east diagonally adjacent switch 20. For example, referring back to FIG. 13, switch S21 exchanges packets with either north-east diagonally adjacent switch S12 via a set of diagonal data paths 30D, or east neighboring switch S22 via a set of normal data paths 30N. Switch S21 may also exchange packets with south-east diagonally adjacent switch S32 via a set of diagonal data paths 30D that interconnects switch S21 with S32.

Also shown in FIG. 14, a fourth static multiplexer 26 is used to select the type of data paths 30 that West router channels 25W should receive packets from/send packets to. Specifically, the fourth static multiplexer 26 is used to select one of the following: a set of normal data paths 30N that interconnect the switch 20 to a west neighboring switch 20, a set of diagonal data paths 30D that interconnect the switch 20 to a north-west diagonally adjacent switch 20, and a different set of diagonal data paths 30D that interconnect the switch 20 to a south-west diagonally adjacent switch 20. For example, referring back to FIG. 13, switch S21 exchanges packets with either north-west diagonally adjacent switch S10 via a set of diagonal data paths 30D, or west neighboring switch S21 via a set of normal data paths 30N. Switch S21 may also exchange packets with south-west diagonally adjacent switch S30 via a set of diagonal data paths 30D that interconnects switch S21 with S30.

Figure 15:
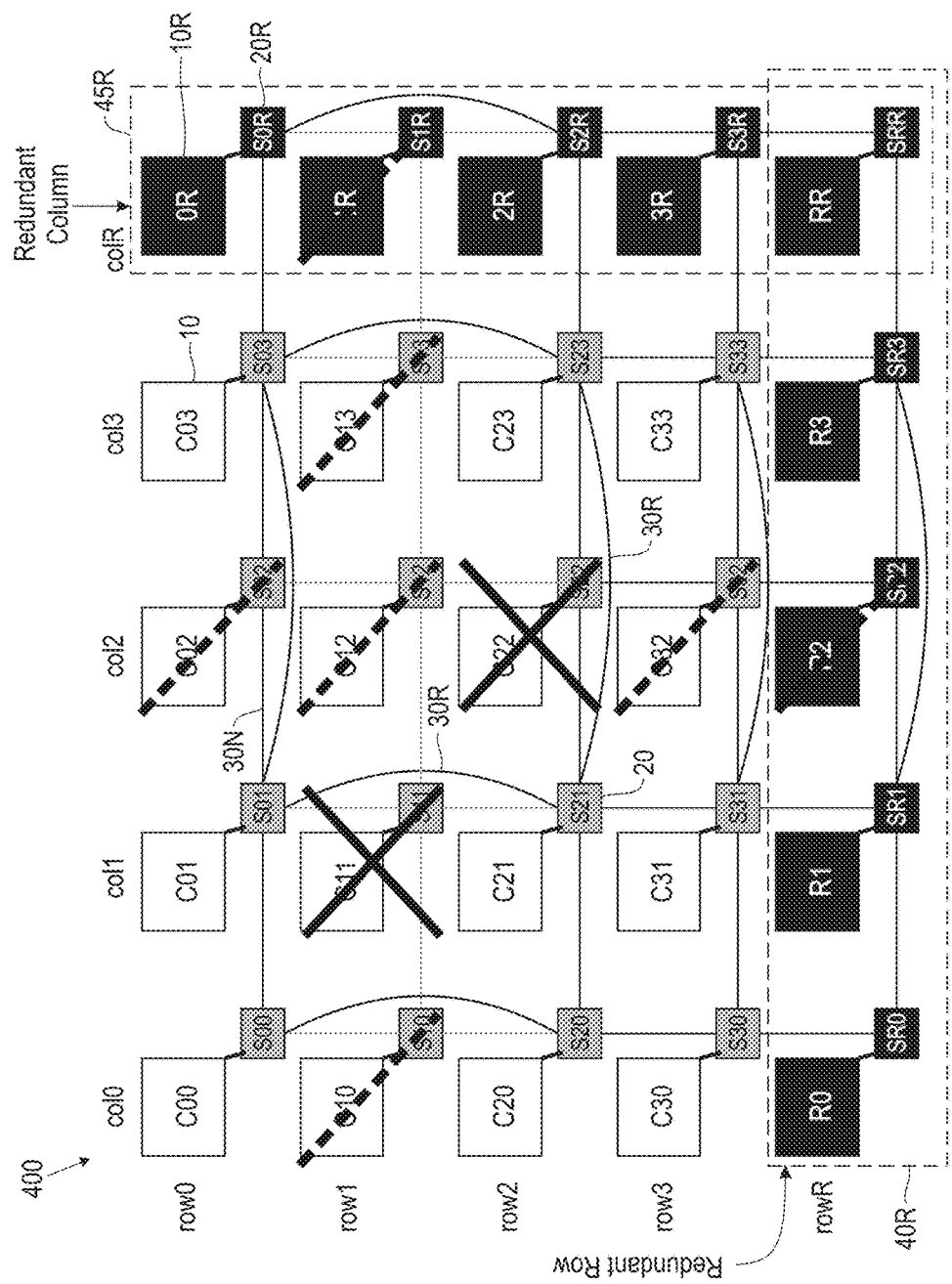
FIG. 15 illustrates an example redundant routing system for a processor array, wherein the routing system includes a redundant column of redundant core circuits and a redundant row of redundant core circuits, in accordance with an embodiment of the invention.

FIG. 15 illustrates an example redundant routing system 400 for a processor array 50, wherein the routing system 400 includes a redundant column 45R of redundant core circuits 10R and a redundant row 40R of redundant core circuits 10, in accordance with an embodiment of the invention. In one embodiment, the array 50 (FIG. 1) comprises a redundant routing system 400 for bypassing a component failure and facilitating full operation of the array 50. The redundant routing system 400 includes all components of the routing system 15 as described above and illustrated in FIG. 1.

The redundant routing system 400 further comprises multiple redundant core circuits 10R, such as redundant core circuits 0R, 1R, 2R, 3R, R0, R1, R2, R3, and RR. The redundant routing system 400 further comprises multiple redundant switches 20R, such as switches S0R, S1R, S2R, S3R, SR0, SR1, SR2, SR3, and SRR. Redundant switches S0R, S1R, S2R, S3R, SR0, SR1, SR2, SR3, and SRR correspond to redundant core circuits 0R, 1R, 2R, 3R, R0, R1, R2, R3, and RR, respectively.

In one embodiment, the redundant core circuits 10R are organized into at least one redundant column 45R and at least one redundant row 40R. Each redundant column 45R is used to bypass a failed column 45. Each redundant row 40R is used to bypass a failed row 40. The redundant routing system 400 recovers one failed column 45 per redundant column 45R, and one failed row 40 per redundant row 40R.

In one embodiment, the maximum number of failed core circuits 10 that a failed column 45 may have is equal to M, wherein M is the number of rows 40 (FIG. 1) of array 50 (FIG. 1). For example, if array 50 has only four rows 40, the maximum number of failed circuits 10 that a failed column 45 may have is four. The maximum number of failed core circuits 10 that a failed row 40 may have is equal to N, wherein N is the number of columns 45 (FIG. 1) of array 50 (FIG. 1). For example, if array 50 has only four columns 45, the maximum number of failed circuits 10 that a failed row 40 may have is four.

The redundant routing system 400 further comprises additional data paths 30 (FIG. 1). In the redundant routing system 400, a data path 30 is either a normal data path 30N or a redundant data path 30R. Redundant data paths 30R are present throughout the array 50. For ease of illustration, only enabled redundant data paths 30R are shown in FIG. 15. As shown in FIG. 15, redundant data paths 30R interconnect switch S00 with switch S20, switch S01 with switch S21, switch S03 with switch S23, redundant switch S0R with redundant switch S2R, switch S01 with switch S03, switch S21 with switch S23, switch S31 with switch S33, and redundant switch SR1 with redundant switch SR3.

As shown in FIG. 15, colR is a redundant column 45R and rowR is a redundant row 40R. The array 50 includes failed core circuit C11 in row1, col1, and failed core circuit C22 in row2, col2. col1 and col2 are failed columns 45, and row1 and row2 are failed rows 40. To facilitate full operation of the array 50, col2 and row1 are bypassed entirely using redundant data paths 30R. Each switch S01 S21, S31, and SR1 of col1 exchanges packets with non-neighboring switch S03, S23, S33, and SR3 of col3 instead of adjacent neighboring switch S02, S22, S32, and SR2 of col2, respectively. Similarly, each switch S03, S23, S33, and SR3 of col3 exchanges packets with non-neighboring switch S01 S21, S31, and SR1 of col1 instead of adjacent neighboring switch S02, S22, S32, and SR2 of col2, respectively. As such, switches S02, S22, S32, and SR2 of col2 are not used to propagate packets.

As col2 is bypassed entirely, colR is used to recover col2.

Further, each switch S00, S01 S03, and S0R of row0 exchanges packets with non-neighboring switch S20, S21, S23, and S2R of row2 instead of adjacent neighboring switch S10, S11, S13, and S1R of row1, respectively. Similarly, each switch S20, S21, S23, and S2R of row2 exchanges packets with non-neighboring switch S00, S01 S03, and S0R of row0 instead of adjacent neighboring switch S10, S11, S13, and S1R of row1, respectively. As such, switches S10, S11, S13, and S1R of row1 are not used to propagate packets. Switch S12 is also not used to propagate packets.

As row1 is bypassed entirely, rowR is used to recover row1.

Figure 16:
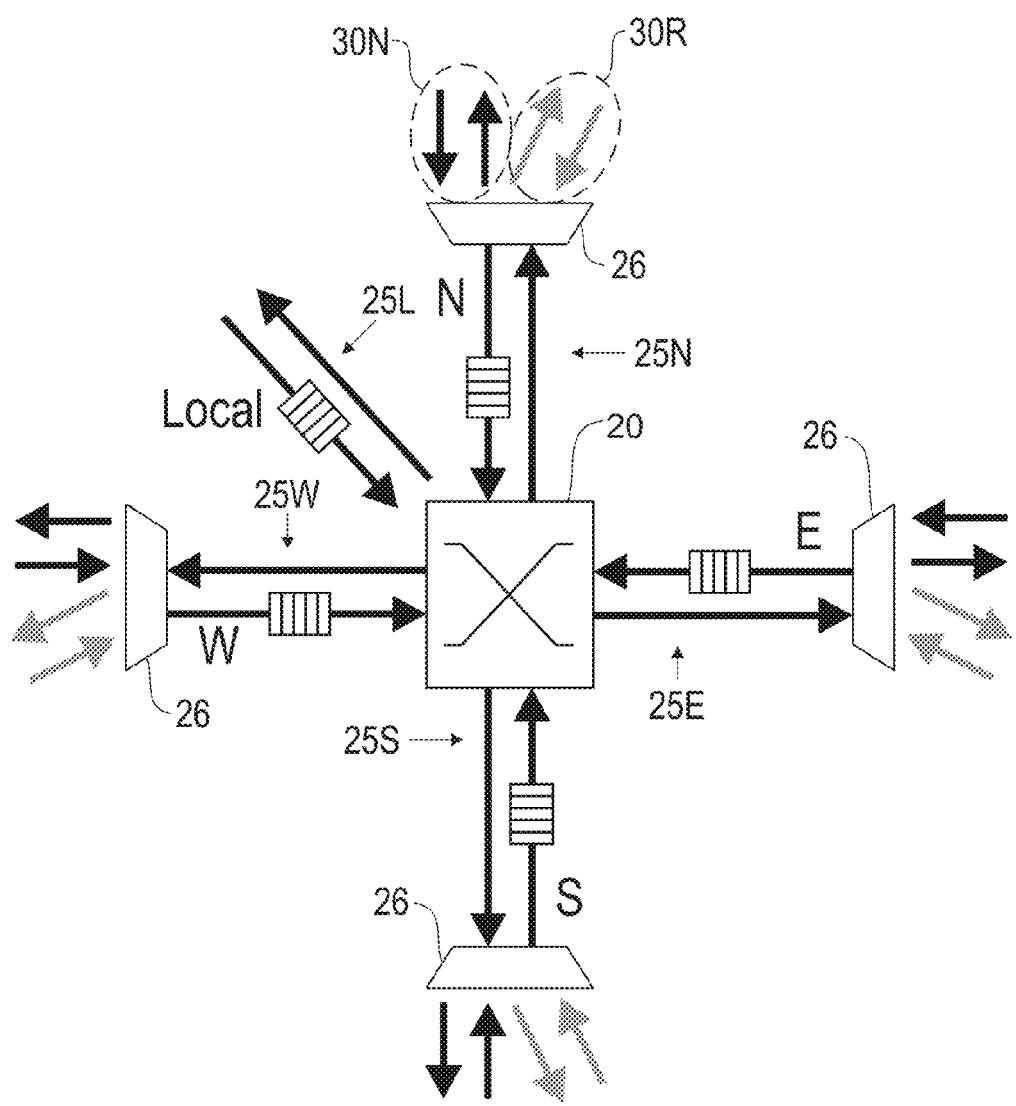
FIG. 16 illustrates an example configuration of a switch 20 in FIG. 15, in accordance with an embodiment of the invention.

FIG. 16 illustrates an example configuration of a switch 20 in FIG. 15, in accordance with an embodiment of the invention. The switch 20 is connected to multiple sets of router channels, such as a set 25L of Local router channels, a set 25N of North router channels, a set 25S of South router channels, a set 25E of East router channels 25E, and a set 25W of West router channels.

A first static multiplexer 26 is used to select one of the following sets of data paths 30 that North router channels 25N should receive packets from/send packets to: a set of normal data paths 30N that interconnect the switch 20 to a north neighboring switch 20, or a set of redundant data paths 30R that interconnect the switch 20 to a north non-neighboring switch 20. For example, referring back to FIG. 15, switch S21 exchanges packets with either north neighboring switch S11 via a set of normal data paths 30N, or north non-neighboring switch S01 via a set of redundant data paths 30R.

A second static multiplexer 26 is used to select one of the following sets of data paths 30 that South router channels 25S should receive packets from/send packets to: a set of normal data paths 30N that interconnect the switch 20 to a south neighboring switch 20, or a set of redundant data paths 30R that interconnect the switch 20 to a south non-neighboring switch 20. For example, referring back to FIG. 15, switch S01 exchanges packets with either south neighboring switch S11 via a set of normal data paths 30N, or south non-neighboring switch S21 via a set of redundant data paths 30R.

A third static multiplexer 26 is used to select one of the following sets of data paths 30 that East router channels 25E should receive packets from/send packets to: a set of normal data paths 30N that interconnect the switch 20 to a east neighboring switch 20, or a set of redundant data paths 30R that interconnect the switch 20 to a east non-neighboring switch 20. For example, referring back to FIG. 15, switch S21 exchanges packets with either east neighboring switch S22 via a set of normal data paths 30N, or east non-neighboring switch S23 via a set of redundant data paths 30R.

A fourth static multiplexer 26 is used to select one of the following sets of data paths 30 that West router channels 25W should receive packets from/send packets to: a set of normal data paths 30N that interconnect the switch 20 to a west neighboring switch 20, or a set of redundant data paths 30R that interconnect the switch 20 to a west non-neighboring switch 20. For example, referring back to FIG. 15, switch S23 exchanges packets with either west neighboring switch S22 via a set of normal data paths 30N, or west non-neighboring switch S21 via a set of redundant data paths 30R.

Figure 17A:
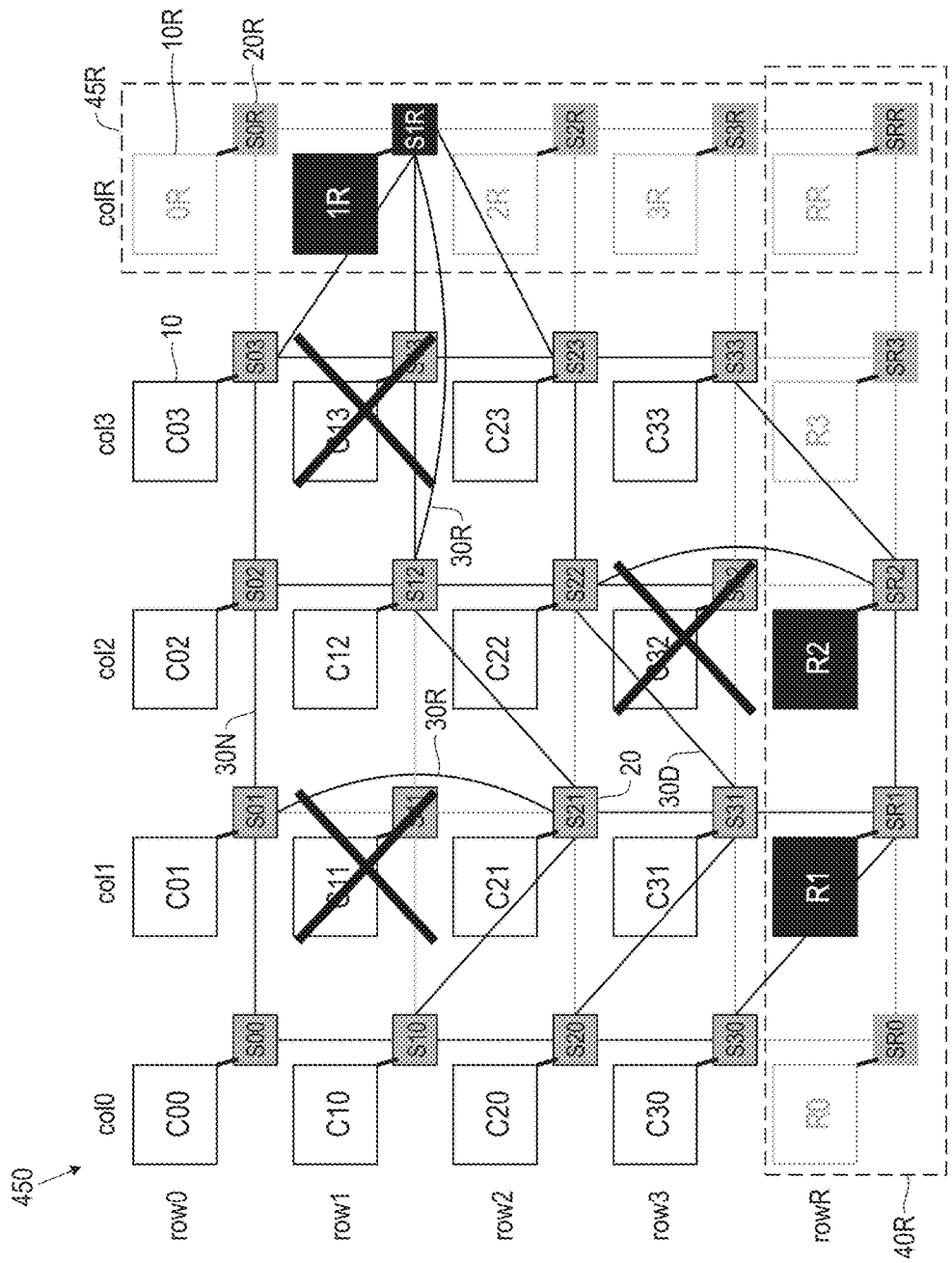
FIG. 17A illustrates an example redundant routing system for a processor array, wherein the routing system includes diagonal data paths, a redundant column of redundant core circuits, and a redundant row of redundant core circuits, in accordance with an embodiment of the invention.

FIG. 17A illustrates an example redundant routing system 450 for a processor array 50, wherein the routing system 450 includes diagonal data paths 30D, a redundant column 45R of redundant core circuits 10, and a redundant row 40R of redundant core circuits 10, in accordance with an embodiment of the invention. In one embodiment, the array 50 (FIG. 1) comprises a redundant routing system 450 for bypassing a component failure and facilitating full operation of the array 50. The redundant routing system 450 includes all components of the routing system 15 as described above and illustrated in FIG. 1.

The redundant routing system 450 further comprises multiple redundant core circuits 10R, such as redundant core circuits 0R, 1R, 2R, 3R, R0, R1, R2, R3, and RR. The redundant routing system 450 further comprises multiple redundant switches 20R, such as switches S0R, S1R, S2R, S3R, SR0, SR1, SR2, SR3, and SRR. Redundant switches S0R, S1R, S2R, S3R, SR0, SR1, SR2, SR3, and SRR correspond to redundant core circuits 0R, 1R, 2R, 3R, R0, R1, R2, R3, and RR, respectively. In one embodiment, the redundant core circuits 10R are organized into at least one redundant column 45R and at least one redundant row 40R.

The redundant routing system 450 recovers N failed core circuits 10 per redundant row 40R, and M failed core circuits 10 per redundant column 45R, wherein M is the number of rows 40 (FIG. 1) of array 50 (FIG. 1), and N is the number of columns 45 (FIG. 1) of array 50. The redundant routing system 450 can tolerate more than one failed core circuit in a row 40 or a column 45.

The redundant routing system 450 further comprises additional data paths 30 (FIG. 1). In the redundant routing system 450, a data path 30 is a normal data path 30N, a redundant data path 30R, or a diagonal data path 30D. Redundant data paths 30R and diagonal data paths 30D are present throughout the array 50. For ease of illustration, only enabled redundant data paths 30R and enabled diagonal data paths 30D are shown in FIG. 17A. As shown in FIG. 17A, redundant data paths 30R interconnect switch S01 with switch S21, switch S12 with redundant switch S1R, and switch S22 with redundant switch SR2. Diagonal data paths 30D interconnect switch S21 with switches S10 and S12, switch S31 with switches S20 and S22, redundant switch SR1 with switch S30, redundant switch SR2 with switch S33, and redundant switch S1R with switch S03.

As shown in FIG. 17A, colR is a redundant column 45R and rowR is a redundant row 40R. The array 50 includes a first failed core circuit C11 in row1, col1, a second failed core circuit C32 in row3, col2, and a third failed core circuit C13 in row1, col3. col1, col2, and col3 are failed columns 45, and row1 and row3 are failed rows 40. row1 includes more than one failed core circuit 10.

To facilitate full operation of the array 50, core circuits C11, C13, and C32 and corresponding switches S11, S13, and S32, respectively, are bypassed using redundant data paths 30R and diagonal data paths 30D. For example, to shift packets around the failed core circuit C11, switches S01 and S21 exchange packets via at least one redundant data path 30R, switches S10 and S21 exchange packets via at least one diagonal data path 30D, and switches S12 and S21 exchange packets via at least one diagonal data path 30D. As such, switch S11 is not used to propagate packets.

As shown in FIG. 17A, two redundant core circuits 10R of rowR, such as redundant core circuits R1 and R2, are used to recover failed core circuits C11 and C32. Further, one redundant core circuit 10R of colR, such as redundant core circuit 1R, is used to recover failed core circuit C13. Alternatively, two redundant core circuits 10R of colR and one redundant core circuit 10R of rowR are used to recover failed core circuits C11, C32, and C13.

Figure 17B:
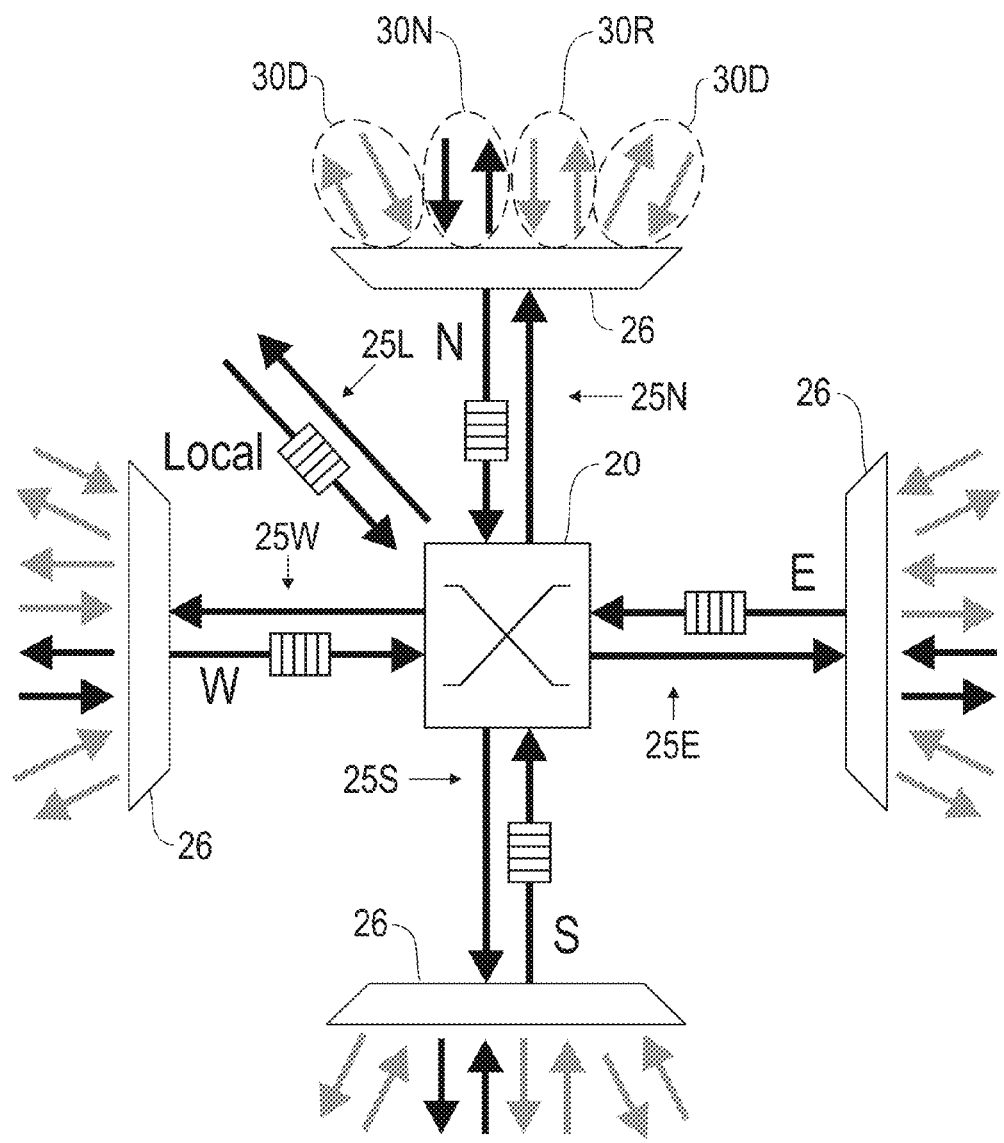
FIG. 17B illustrates an example configuration of a switch in FIG. 17A, in accordance with an embodiment of the invention.

FIG. 17B illustrates an example configuration of a switch 20 in FIG. 17A, in accordance with an embodiment of the invention. The switch 20 is connected to multiple sets of router channels, such as Local router channels 25L, North router channels 25N, South router channels 25S, East router channels 25E, and West router channels 25W.

A first static multiplexer 26 is used to select one of the following sets of data paths 30 that North router channels 25N should receive packets from/send packets to: a set of normal data paths 30N that interconnect the switch 20 to a north neighboring switch 20, a set of redundant data paths 30R that interconnect the switch 20 to a north non-neighboring switch 20, a set of diagonal data paths 30D that interconnect the switch 20 to a north-east diagonally adjacent switch 20, and a different set of diagonal data paths 30D that interconnect the switch 20 to a north-west diagonally adjacent switch 20.

A second static multiplexer 26 is used to select one of the following sets of data paths 30 that South router channels 25S should receive packets from/send packets to: a set of normal data paths 30N that interconnect the switch 20 to a south neighboring switch 20, a set of redundant data paths 30R that interconnect the switch 20 to a south non-neighboring switch 20, a set of diagonal data paths 30D that interconnect the switch 20 to a south-east diagonally adjacent switch 20, and a different set of diagonal data paths 30D that interconnect the switch 20 to a south-west diagonally adjacent switch 20.

A third static multiplexer 26 is used to select one of the following sets of data paths 30 that East router channels 25E should receive packets from/send packets to: a set of normal data paths 30N that interconnect the switch 20 to an east neighboring switch 20, a set of redundant data paths 30R that interconnect the switch 20 to an east non-neighboring switch 20, a set of diagonal data paths 30D that interconnect the switch 20 to a north-east diagonally adjacent switch 20, and a different set of diagonal data paths 30D that interconnect the switch 20 to a south-east diagonally adjacent switch 20.

A fourth static multiplexer 26 is used to select one of the following sets of data paths 30 that West router channels 25W should receive packets from/send packets to: a set of normal data paths 30N that interconnect the switch 20 to a west neighboring switch 20, a set of redundant data paths 30R that interconnect the switch 20 to a west non-neighboring switch 20, a set of diagonal data paths 30D that interconnect the switch 20 to a north-west diagonally adjacent switch 20, and a different set of diagonal data paths 30D that interconnect the switch 20 to a south-west diagonally adjacent switch 20. For example, referring back to FIG. 17A, redundant switch S1R exchanges packets with one of the following: west neighboring switch S13 via a set of normal data paths 30N, west non-neighboring switch S12 via a set of redundant data paths 30R, north-west diagonally adjacent switch S03 via a set of diagonal data paths 30D, and south-west diagonally adjacent switch S23 via a different set of diagonal data paths 30D.

Figure 18:
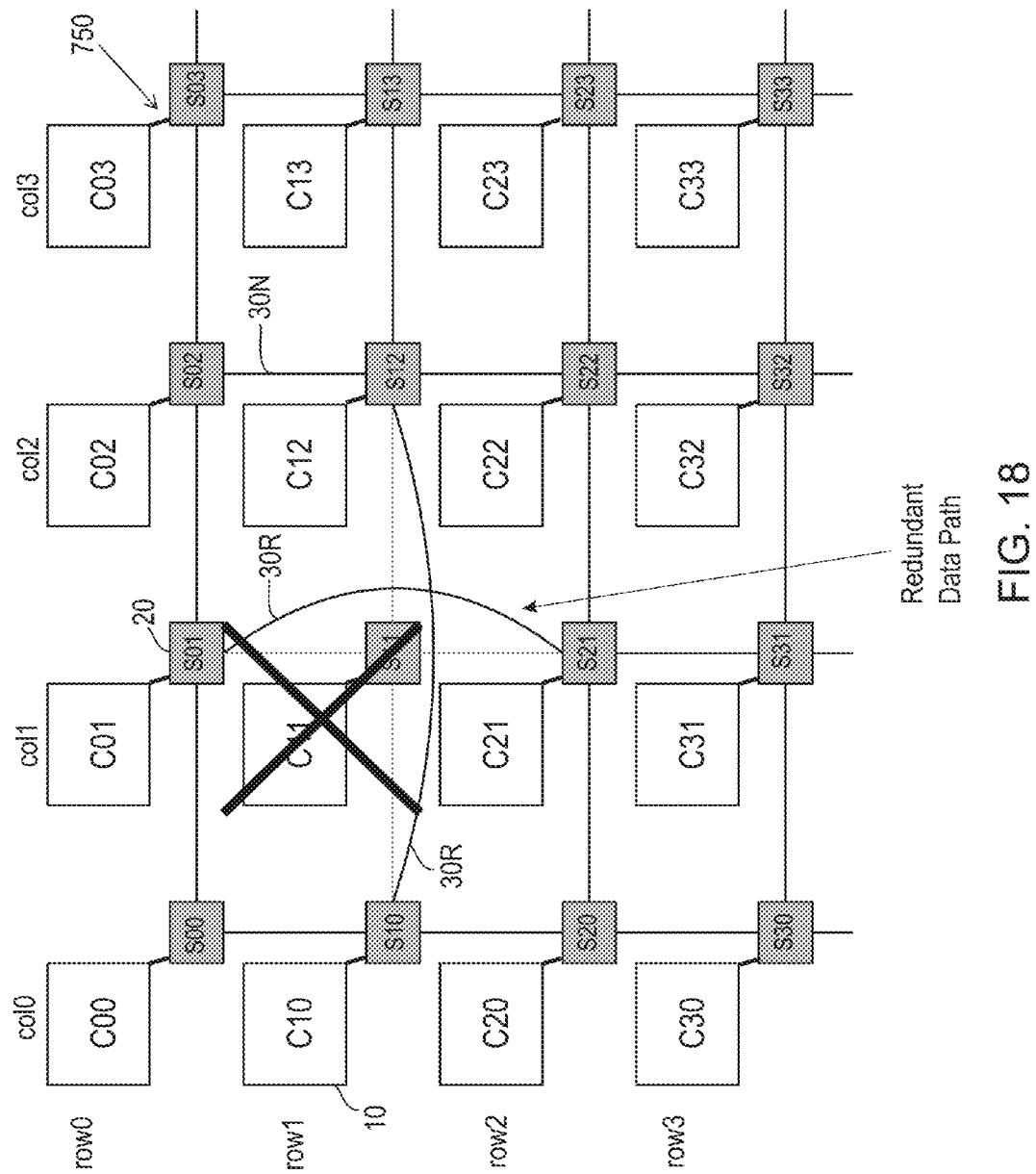
FIG. 18 illustrates an example redundant routing system for a processor array, wherein the redundant routing system bypasses a component failure using redundant data paths, in accordance with an embodiment of the invention.

FIG. 18 illustrates an example redundant routing system 750 for a processor array 50, wherein the redundant routing system 750 bypasses a component failure using redundant data paths 30R, in accordance with an embodiment of the invention. In one embodiment, the array 50 (FIG. 1) comprises a redundant routing system 750 for bypassing a component failure. The redundant routing system 750 includes all components of the routing system 15 as described above and illustrated in FIG. 1.

The redundant routing system 750 further comprises additional data paths 30 (FIG. 1). In the redundant routing system 750, each data path 30 is either a normal data path 30N or a redundant data path 30R. Redundant data paths 30R are present throughout the array 50. For ease of illustration, only enabled redundant data paths 30R are shown in FIG. 18.

Each redundant data path 30R interconnects non-neighboring switches 20 in different rows 40 (FIG. 1) or different columns 45 (FIG. 3). For example, as shown in FIG. 18, switch S10 in col0 is interconnected with switch S12 in col2 via at least one redundant data path 30R, and switch S01 in row0 is interconnected with switch S21 in row2 via at least one redundant data path 30R.

As shown in FIG. 18, col1 of the array 50 includes at least one of the following component failures: a failed core circuit C11, a failed switch S11, or a failed normal data path 30N that interconnects switch S11 to a neighboring switch 20.

The redundant routing system 750 bypasses the core circuit C11 and the corresponding switch S11 using redundant data paths 30R that interconnect switches in different rows 40 or different columns 45.

The number of component failures the redundant routing system 750 can bypass is up to one-half the size of the array 50. The redundant routing system 750 does not utilize redundant core circuits 10R or redundant routers 20R. As such, the number of core circuits 10 that the array 50 logically represents is directly reduced by the number of bypassed core circuits 10.

In one embodiment, each switch 20 of the redundant routing system 750 is implemented in the same manner as each switch 20 of the redundant routing system 400 (FIG. 15). For example, each switch 20 of the redundant routing system 750 has a first static multiplexer 26 (FIG. 16) for a set 25N of North router channels, a second static multiplexer 26 (FIG. 16) for a set 25S of South router channels, a third static multiplexer 26 (FIG. 16) for a set 25E of East router channels, and a fourth static multiplexer 26 (FIG. 16) for a set 25W of West router channels. Each static multiplexer 26 is configured to select between a set of normal data paths 30N or a set of redundant data paths 30R.

As stated above, multiple core circuits 10 may be organized into a three-dimensional 3-D processor array.

Figure 19:
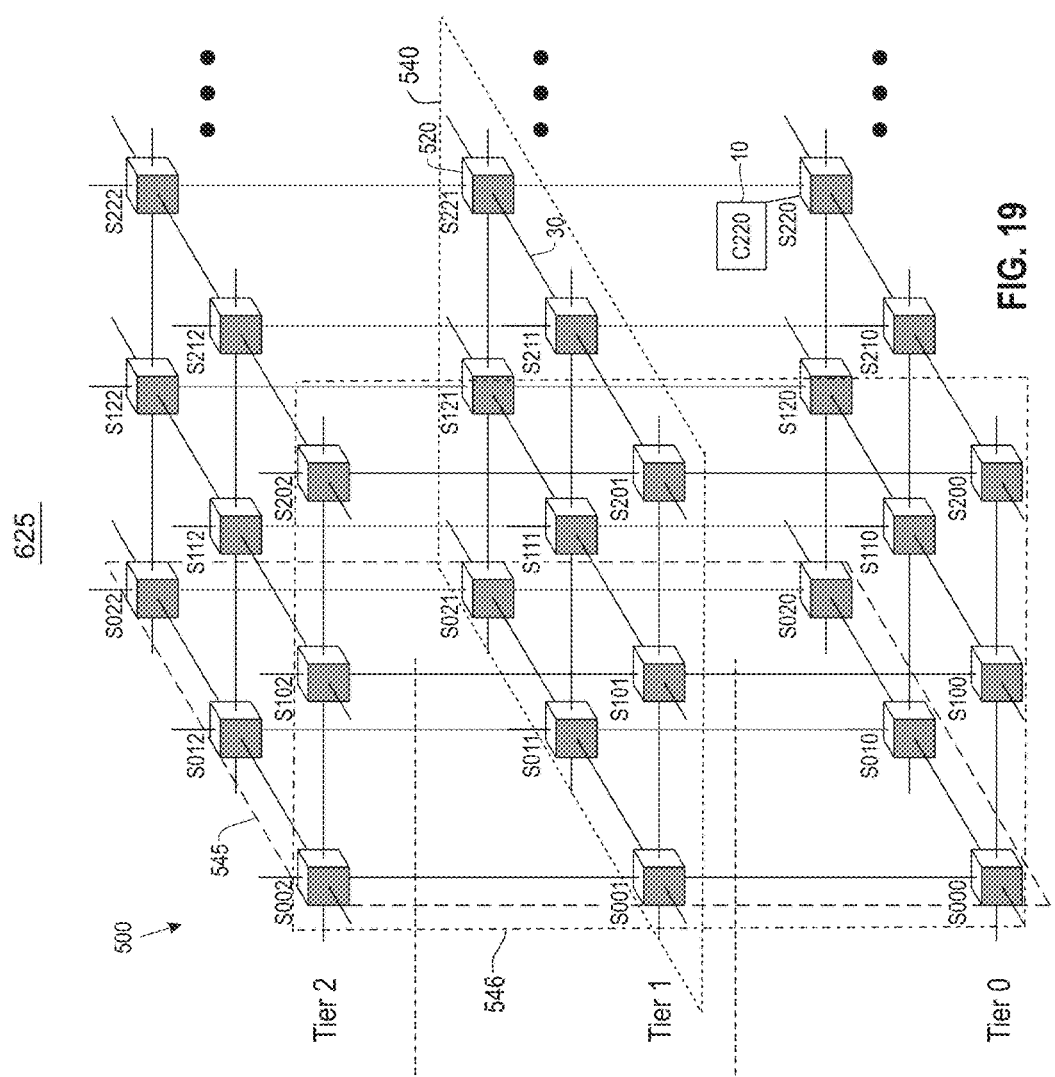
FIG. 19 illustrates a routing system for a three-dimensional (3-D) processor array, wherein the routing system includes 3-D switches, in accordance with an embodiment of the invention.

FIG. 19 illustrates a routing system 500 for a 3-D processor array 625, wherein the routing system 500 includes three-dimensional switches 520, in accordance with an embodiment of the invention. A 3-D processor array 625 includes multiple core circuits 10.

A routing system 500 for a 3-D array 625 comprises multiple 3-D switches 520 and multiple data paths 30. The routing system 500 is a multidimensional switch network. Each 3-D switch 520 corresponds to a core circuit 10 of the array 625. As described in detail later herein, each 3-D switch 520 is interconnected with a corresponding core circuit 10 via at least one data path 30. Each 3-D switch 520 is further interconnected with at least one adjacent neighboring 3-D switch 520 via at least one data path 30.

The processor array has multiple X-Y planes 540 (e.g., Tier 0, Tier 1, and Tier 2), multiple Y-Z planes 545, and multiple X-Z planes 546. As shown in FIG. 19, Tier 0 includes switches S000, S010, S020, S100, S110, S120, S200, S210, and S220. Tier 1 includes switches S001, S011, S021, S101, S111, S121, S201, S211, and S221. Tier 2 includes switches S002, S012, S022, S102, S112, S122, S202, S212, and S222.

For ease of illustration, only the corresponding core circuit 10 for switch S220 is shown (i.e., C220).

As described in detail later herein, Z routing interconnects the X-Y planes 540, and X-Y routing interconnects the switches 520 within an X-Y plane 540.

Figure 20:
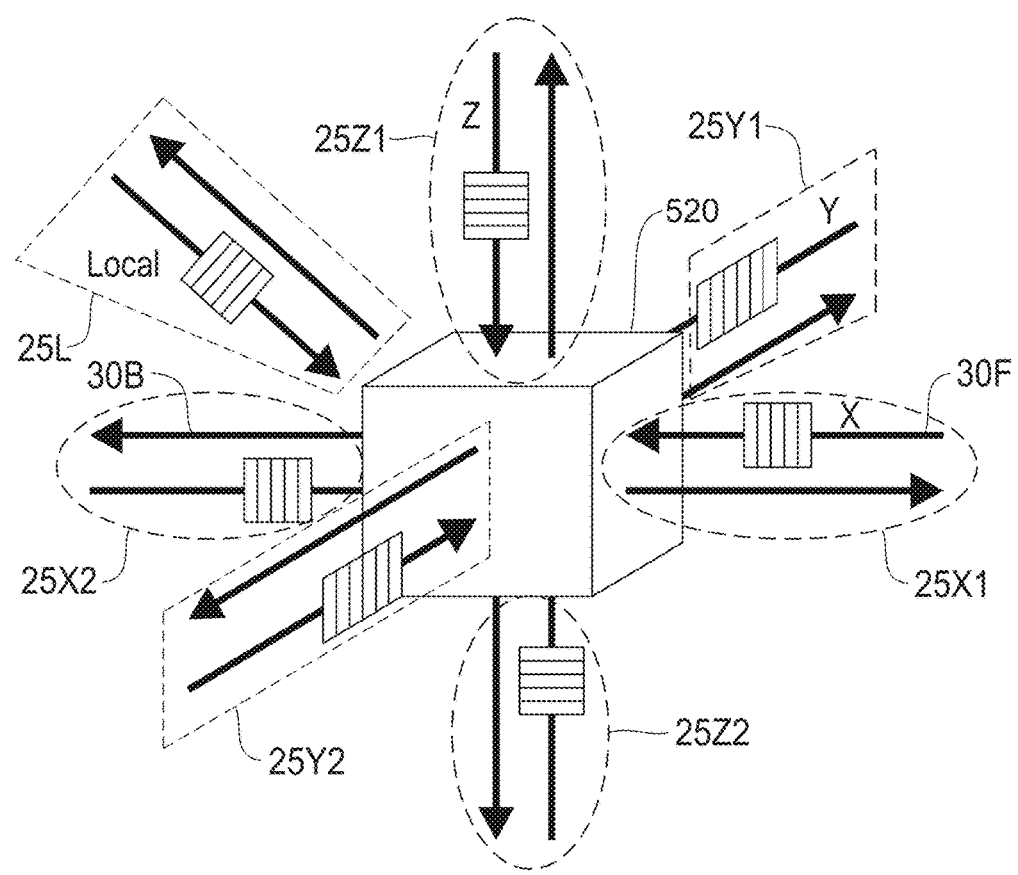
FIG. 20 illustrates an example configuration of a 3-D switch in FIG. 19, in accordance with an embodiment of the invention.

FIG. 20 illustrates an example configuration of a 3-D switch 520 in FIG. 19, in accordance with an embodiment of the invention. In one embodiment, multiple data paths 30 (FIG. 19) interconnect the 3-D switch 520 with neighboring components of the 3-D switch 520 (e.g., a corresponding core circuit 10, neighboring 3-D switches 520).

In one embodiment, the 3-D switch 520 exchanges packets with neighboring components via multiple sets of router channels, wherein each set of router channels has an incoming router channel 30F and a reciprocal router channel 30B. As shown in FIG. 20, a first set 25L of router channels ("Local router channels") interconnects the 3-D switch 520 with a corresponding core circuit 10 (FIG. 19). The 3-D switch 520 receives packets generated by the corresponding core circuit 10 via an incoming router channel 30F of the set 25L, and sends packets targeting the corresponding core circuit 10 via an outgoing router channel 30B of the set 25L.

A second set 25X1 and a third set 25X2 of router channels ("X router channels") interconnects the 3-D switch 520 with an adjacent neighboring 3-D switch 520 in a first X direction with increasing X coordinates ("X+ direction"), and a different adjacent neighboring 3-D switch 520 in a second X direction with decreasing X coordinates ("X− direction"), respectively.

A fourth set 25Y1 and a fifth set 25Y2 of router channels ("Y router channels") interconnects the 3-D switch 520 with an adjacent neighboring 3-D switch 520 in a first Y direction with increasing Y coordinates ("Y+ direction"), and a different adjacent neighboring 3-D switch 520 in a second Y direction with decreasing Y coordinates ("Y− direction"), respectively.

A sixth set 25Z1 and a seventh set 25Z2 of router channels ("Z router channels") interconnects the 3-D switch 520 with an adjacent neighboring 3-D switch 520 in a first Z direction with increasing Z coordinates ("Z+ direction"), and a different adjacent neighboring 3-D switch 520 in a second Z direction with decreasing Z coordinates ("Z− direction"), respectively.

For example, referring back to FIG. 19, switch S111 is interconnected with adjacent neighboring switches S211 in the X+ direction, S011 in the X− direction, S121 in the Y+ direction, S101 in the Y− direction, S112 in the Z+ direction, and S110 in the Z− direction.

Figure 21A:
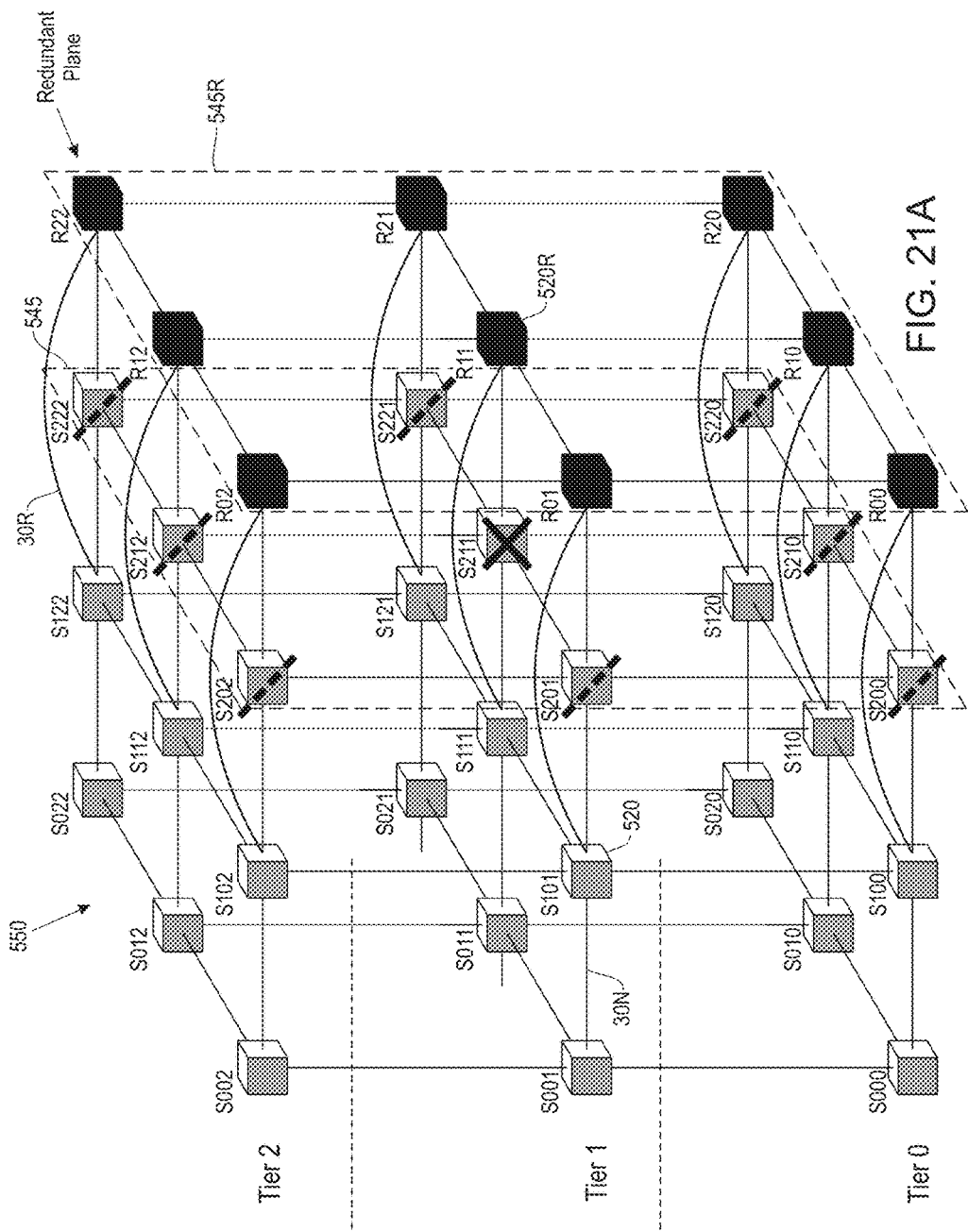
FIG. 21A illustrates an example redundant routing system for a 3-D processor array, wherein the routing system includes redundant data paths and a redundant plane, in accordance with an embodiment of the invention.

FIG. 21A illustrates an example redundant routing system 550 for a 3-D processor array 625, wherein the routing system 550 includes redundant data paths 30R and a redundant plane 545R, in accordance with an embodiment of the invention. In one embodiment, the array 625 (FIG. 1) comprises a redundant routing system 550 for bypassing a component failure and facilitating full operation of the array 625. The redundant routing system 550 is a multidimensional switch network that includes all components of the routing system 500 as described above and illustrated in FIG. 19.

The redundant routing system 550 further comprises additional 3-D switches 520, such as 3-D switches R00, R01, R02, R10, R11, R12, R20, R21, and R22. These additional 3-D switches 520 are redundant 3-D switches 520R. In one embodiment, the redundant 3-D switches 520 are organized into at least one redundant plane 545R. A redundant plane 545R may be an X-Y plane 540, a Y-Z plane 545, or a X-Z plane 546. For example, the redundant plane 545R shown in FIG. 21A is Y-Z plane 545. A redundant plane 545R may be disposed anywhere in the array 625. In one embodiment, one component failure is bypassed using an entire redundant plane 545R.

The redundant routing system 550 further comprises additional data paths 30 (FIG. 1). In the redundant routing system 550, a data path 30 is either a normal data path 30N or a redundant data path 30R. Redundant data paths 30R are present throughout the array 625. For ease of illustration, only enabled redundant data paths 30R are shown in FIG. 21A. A normal data path 30N interconnects adjacent neighboring 3-D switches 520 (e.g., a data path 30N interconnecting switch S001 with adjacent neighboring switch S101). By comparison, a redundant data path 30R interconnects non-neighboring 3-D switches 520. Each redundant data path 30R provides an alternate pathway for routing around a component failure.

As shown in FIG. 21A, redundant data paths 30R interconnect 3-D switch S100 with redundant 3-D switch R00, 3-D switch S110 with redundant 3-D switch R10, 3-D switch S120 with redundant 3-D switch R20, 3-D switch S101 with redundant 3-D switch R01, 3-D switch S111 with redundant 3-D switch R11, 3-D switch S121 with redundant 3-D switch R21, 3-D switch S102 with redundant 3-D switch R02, 3-D switch S112 with redundant 3-D switch R12, and 3-D switch S122 with redundant 3-D switch R22.

Each 3-D switch 520 exchanges packets with adjacent neighboring 3-D switches 520 via normal data paths 30N. Some 3-D switches 520 may also exchange packets with non-neighboring 3-D switches 520 via redundant data paths 30R. For example, as shown in FIG. 21A, 3-D switch S100 may exchange packets with non-neighboring redundant 3-D switch R00 via at least one redundant data path 30R.

As shown in FIG. 21A, the third Y-Z plane 545 includes failed 3-D switch S211. To facilitate full operation of the array 625, the third Y-Z plane 545 including failed 3-D switch S211 is bypassed entirely using redundant data paths 30R. As such, switches S200, S201, S202, S210, S211, S212, S220, S221, and S222 of the third Y-Z plane 545 are not used to propagate packets.

As the third Y-Z plane 545 including failed 3-D switch S211 is bypassed entirely, a redundant plane 545R is used to recover the bypassed third Y-Z plane 545. Even though only 3-D switch S211 failed, each redundant 3-D switch 520R of the redundant plane 545R serves as a backup for a 3-D switch 520 of the bypassed third Y-Z plane 545. For example, each redundant 3-D switch R00, R01, R02, R10, R11, R12, R20, R21, and R22 of the redundant plane 545R is used to recover 3-D switch S200, S201, S202, S210, S211, S212, S220, S221, and S222 of the third Y-Z plane 545, respectively.

Figure 21B:
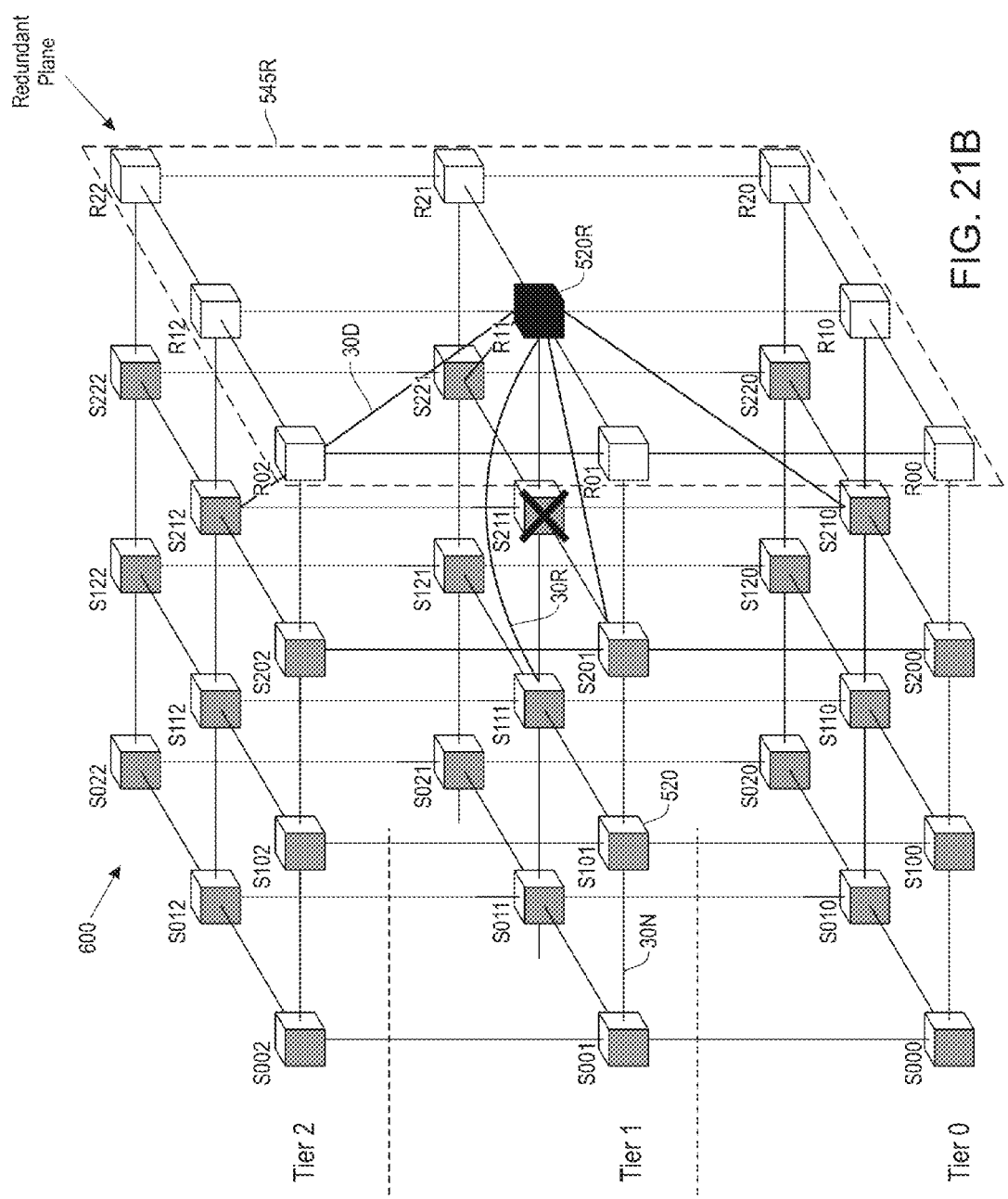
FIG. 21B illustrates an example redundant routing system for a 3-D processor array, wherein the routing system includes diagonal data paths and a redundant plane, in accordance with an embodiment of the invention.

FIG. 21B illustrates an example redundant routing system 600 for a 3-D processor array 625, wherein the routing system 600 includes diagonal data paths 30D and a redundant plane 545R, in accordance with an embodiment of the invention. In one embodiment, the array 625 (FIG. 19) comprises a redundant routing system 600 for bypassing a component failure and facilitating full operation of the array 625. The redundant routing system 600 is a multidimensional switch network. The redundant routing system 600 includes all components of the routing system 500 as described above and illustrated in FIG. 19.

The redundant routing system 600 further comprises additional 3-D switches 520, such as 3-D switches R00, R01, R02, R10, R11, R12, R20, R21, and R22. These additional 3-D switches circuits 520 are redundant 3-D switches 520R. In one embodiment, the redundant 3-D switches 520 are organized into at least one redundant plane 545R.

The redundant routing system 600 further comprises additional data paths 30 (FIG. 1). In the redundant routing system 600, a data path 30 is a normal data path 30N, a redundant data path 30R, or a diagonal data path 30D. Redundant data paths 30R and diagonal data paths 30D are present throughout the array 625. For ease of illustration, only enabled redundant data paths 30R and enabled diagonal data paths 30D are shown in FIG. 21B. A diagonal data path 30D interconnects diagonally adjacent neighboring 3-D switches 520. Each diagonal data path 30D provides an alternate pathway for routing around a component failure.

As shown in FIG. 21B, diagonal data paths 30D interconnect redundant 3-D switch R11 with 3-D switches S201, S210, S212, and S221. Further, a redundant data path 30R interconnects 3-D switch S111 with redundant 3-D switch R11.

As shown in FIG. 21B, 3-D switch S211 is a failed 3-D switch 520. To facilitate full operation of the array 625, failed 3-D switch S211 is bypassed entirely using the diagonal data paths 30D and the redundant data path 30R. As such, 3-D switch S211 is not used to propagate packets. A redundant 3-D switch 520R of the redundant plane 545R, such as redundant 3-D switch R11, serves as a backup for failed 3-D switch S211.

FIG. 22 illustrates an example redundant routing system 800 for a 3-D processor array 625, wherein the routing system 800 includes only redundant data paths 30R, in accordance with an embodiment of the invention. In one embodiment, the array 625 (FIG. 1) comprises a redundant routing system 800 for bypassing a component failure. The redundant routing system 800 is a multidimensional switch network that includes all components of the routing system 500 as described above and illustrated in FIG. 19.

The redundant routing system 800 further comprises additional data paths 30 (FIG. 1). In the redundant routing system 800, each data path 30 is either a normal data path 30N or a redundant data path 30R. Redundant data paths 30R are present throughout the array 625. For ease of illustration, only enabled redundant data paths 30R are shown in FIG. 22.

Each redundant data path 30R interconnects non-neighboring switches 520 in different X-Y planes 540 (FIG. 19), different Y-Z planes 545 (FIG. 19), or different X-Z planes 546 (FIG. 19). For example, as shown in FIG. 22, switches S101 and S121 in different X-Z planes 546 are interconnected via at least one redundant data path 30R, switches S011 and S211 in different Y-Z planes 545 are interconnected via at least one redundant data path 30R, and switches S110 and S112 in different X-Y planes 540 are interconnected via at least one redundant data path 30R.

As shown in FIG. 22, switch S111 is a failed switch. The redundant routing system 800 bypasses the switch S111 and corresponding core circuit 10 using redundant data paths 30R that interconnect switches in different X-Y planes 540, different Y-Z planes 545, or different X-Z planes 546.

The number of component failures the redundant routing system 800 can bypass is up to one-half the size of the array 625. The redundant routing system 800 does not utilize redundant core circuits 10R or redundant routers 20R. As such, the number of core circuits 10 that the array 625 logically represents is directly reduced by the number of bypassed core circuits 10.

The redundant routing system 800 further comprises additional data paths 30 (FIG. 1). In the redundant routing system 800, a data path 30 is either a normal data path 30N or a redundant data path 30R. A normal data path 30N interconnects adjacent neighboring 3-D switches 520 (e.g., a data path 30N interconnecting switch S001 with adjacent neighboring switch S101). By comparison, a redundant data path 30R interconnects non-neighboring 3-D switches 520. Each redundant data path 30R provides an alternate pathway for routing around a component failure.

As shown in FIG. 22, redundant data paths 30R interconnect 3-D switch S101 with 3-D switch S121, 3-D switch S110 with 3-D switch S112, and 3-D switch S011 with 3-D switch S211.

As shown in FIG. 22, the second Y-Z plane 545 includes failed 3-D switch S111. To facilitate operation of the array 625, the failed 3-D switch S111 is bypassed entirely using redundant data paths 30R. As such, switch S111 is not used to propagate packets.

Figure 23:
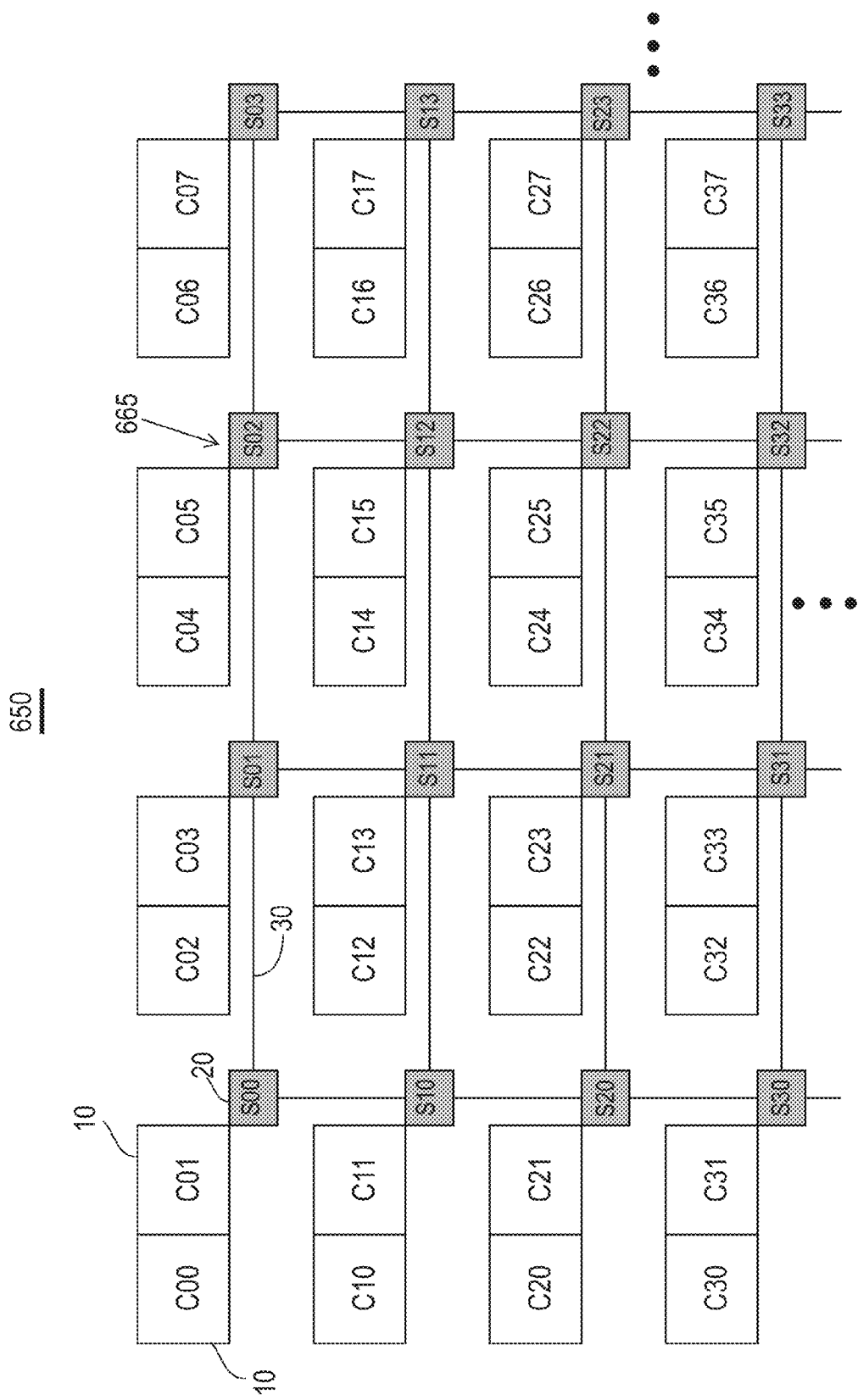
FIG. 23 illustrates an example processor array including multiple switches, wherein each switch is a communication interface to one or more core circuits, in accordance with an embodiment of the invention.

FIG. 23 illustrates an example processor array 650 including multiple switches 20, wherein each switch 20 is a communication interface to one or more core circuits 10, in accordance with an embodiment of the invention. The array 650 comprises multiple processor core circuits 10. As shown in FIG. 23, some of the core circuits 10 of the array 650 are physically labeled as core circuits C00, C01, C02, C03, C04, C05, C06, C07, C10, C11, C12, C13, C14, C15, C16, C17, C20, C21, C22, C23, C24, C25, C26, C27, C30, C31, C32, C33, C34, C35, C36, and C37.

The array 650 further comprises a routing system 665 for routing packets between the core circuits 10. The routing system 665 includes multiple switches 20 and multiple data paths 30. As shown in FIG. 23, the routing system 665 includes switches S00, S01 S02, S03, S10, S11, S12, S13, S20, S21, S22, S23, S30, S31, S32, and S33. As stated above, each switch 20 corresponds to one or more core circuits 10. For example, as shown in FIG. 23, each switch 20 corresponds to two core circuits 10. Switch S00 in FIG. 23, for example, corresponds to core circuits C00 and C01.

In one embodiment, for each switch 20, the set 25L of Local router channels (FIG. 2) of said switch 20 is a communication interface to one or more corresponding core circuits 10. For example, for each switch 20 in FIG. 23, the set 25L of Local router channels 25L of said switch 20 is a communication interface to two core circuits 10.

Figure 24:
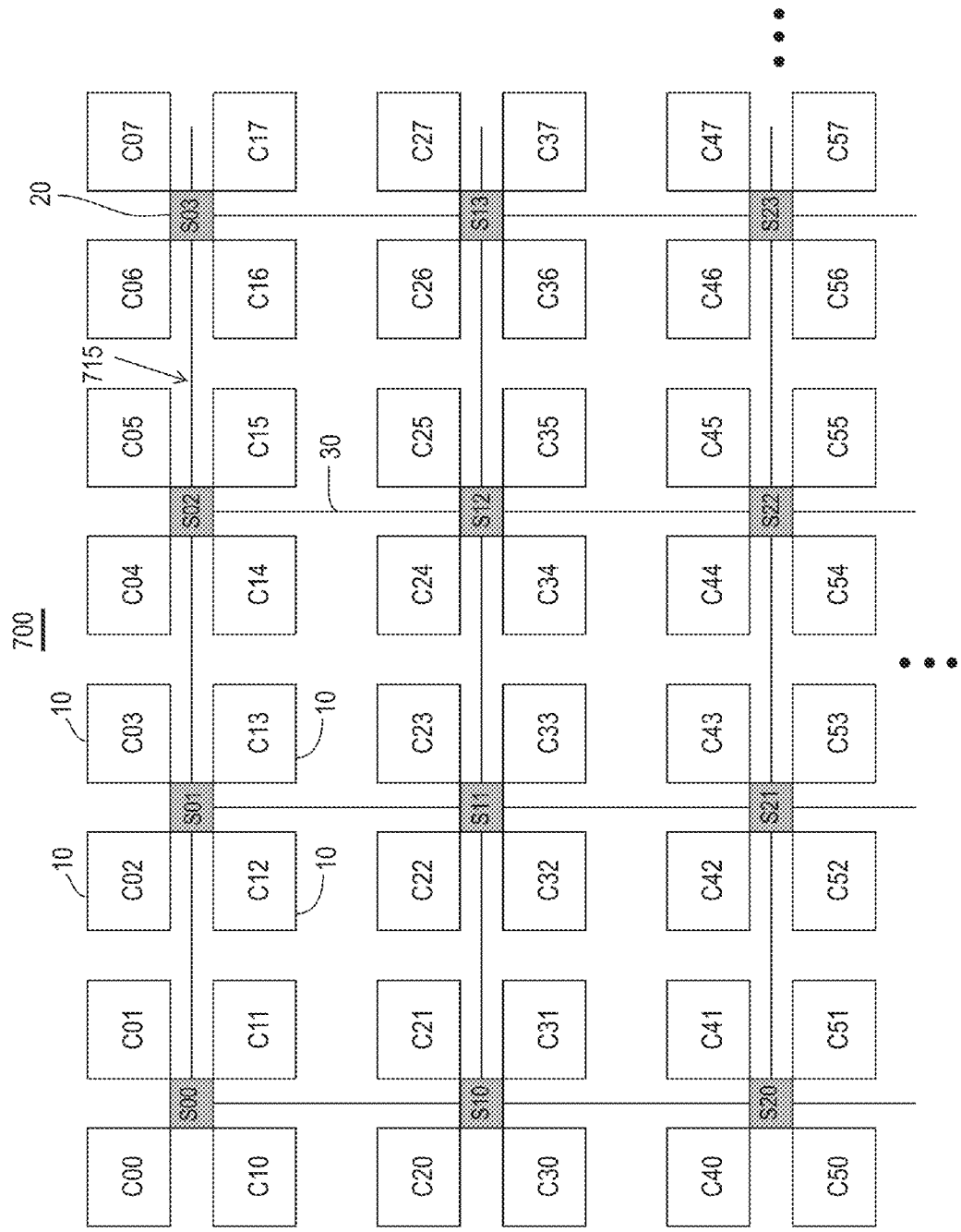
FIG. 24 illustrates an example processor array including multiple switches, wherein each switch has multiple sets of Local router channels, in accordance with an embodiment of the invention.

FIG. 24 illustrates an example processor array 700 including multiple switches 20, wherein each switch 20 has multiple sets 25L of Local router channels, in accordance with an embodiment of the invention. The array 700 comprises multiple processor core circuits 10. As shown in FIG. 24, some of the core circuits 10 of the array 700 are physically labeled as core circuits C00, C01, C02, C03, C04, C05, C06, C07, C10, C11, C12, C13, C14, C15, C16, C17, C20, C21, C22, C23, C24, C25, C26, C27, C30, C31, C32, C33, C34, C35, C36, C37, C40, C41, C42, C43, C44, C45, C46, C47, C50, C51, C52, C53, C54, C55, C56, and C57.

The array 700 further comprises a routing system 715 for routing packets between the core circuits 10. The routing system 715 includes multiple switches 20 and multiple data paths 30. As shown in FIG. 24, the routing system 715 includes switches S00, S01, S02, S03, S10, S11, S12, S13, S20, S21, S22, and S23. Each switch 20 corresponds to four core circuits 10. Switch S00 in FIG. 24, for example, corresponds to core circuits C00, C01, C10, and C11.

Figure 25:
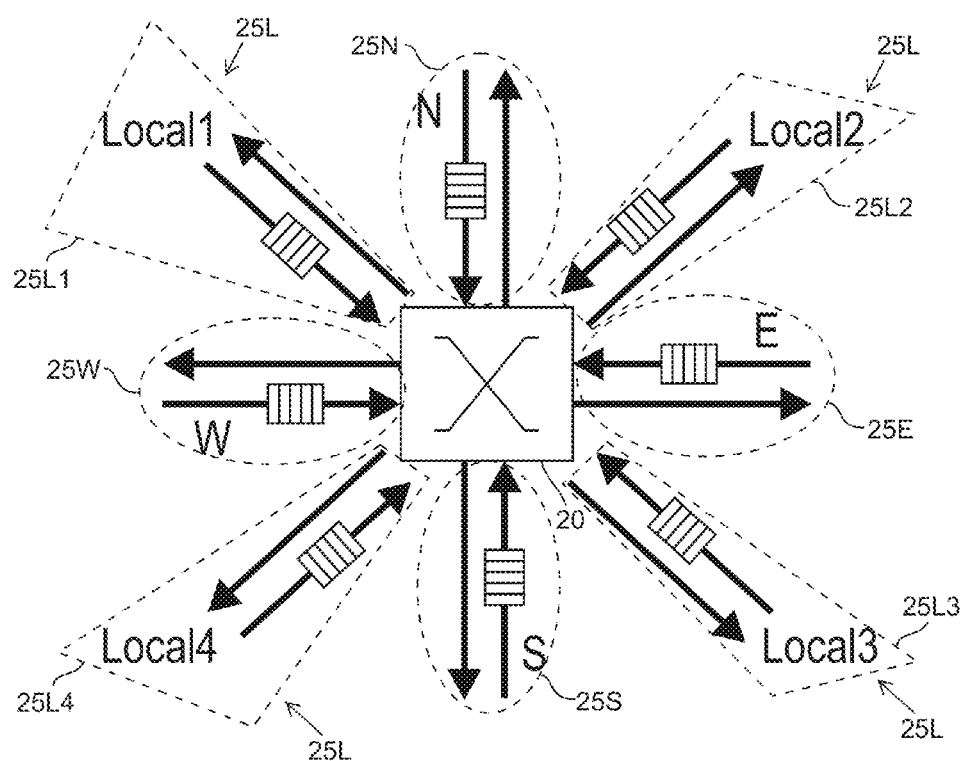
FIG. 25 illustrates an example configuration of a switch in FIG. 24, in accordance with an embodiment of the invention.

FIG. 25 illustrates an example configuration of a switch 20 in FIG. 24, in accordance with an embodiment of the invention. In one embodiment, for each switch 20, said switch 20 is connected to each corresponding core circuit 10 via a set 25L of Local router channels.

As stated above, each switch 20 in FIG. 24 corresponds to four core circuits 10. Accordingly, a first set 25L1 of Local router channels interconnects the switch 20 with a first corresponding core circuit 10. A second set 25L2 of Local router channels interconnects the switch 20 with a second corresponding core circuit 10. A third set 25L3 of Local router channels interconnects the switch 20 with a third corresponding core circuit 10. A fourth set 25L4 of Local router channels interconnects the switch 20 with a fourth corresponding core circuit 10.

Switch S00 in FIG. 24, for example, is connected with core circuits C00, C01, C10, and C11 via a first set 25L1, a second set 25L2, a third set 25L3, and a fourth set 25L4 of Local router channels, respectively.

Also shown in FIG. 25, for each switch 20, a set 25N of North router channels interconnects said switch 20 with a north neighboring switch 20, a set 25S of South router channels interconnects said switch 20 with a south neighboring switch 20, a set 25E of East router channels interconnects said switch 20 with an east neighboring switch 20, and a set 25W of West router channels interconnects said switch 20 with a west neighboring switch 20.

Figure 26:
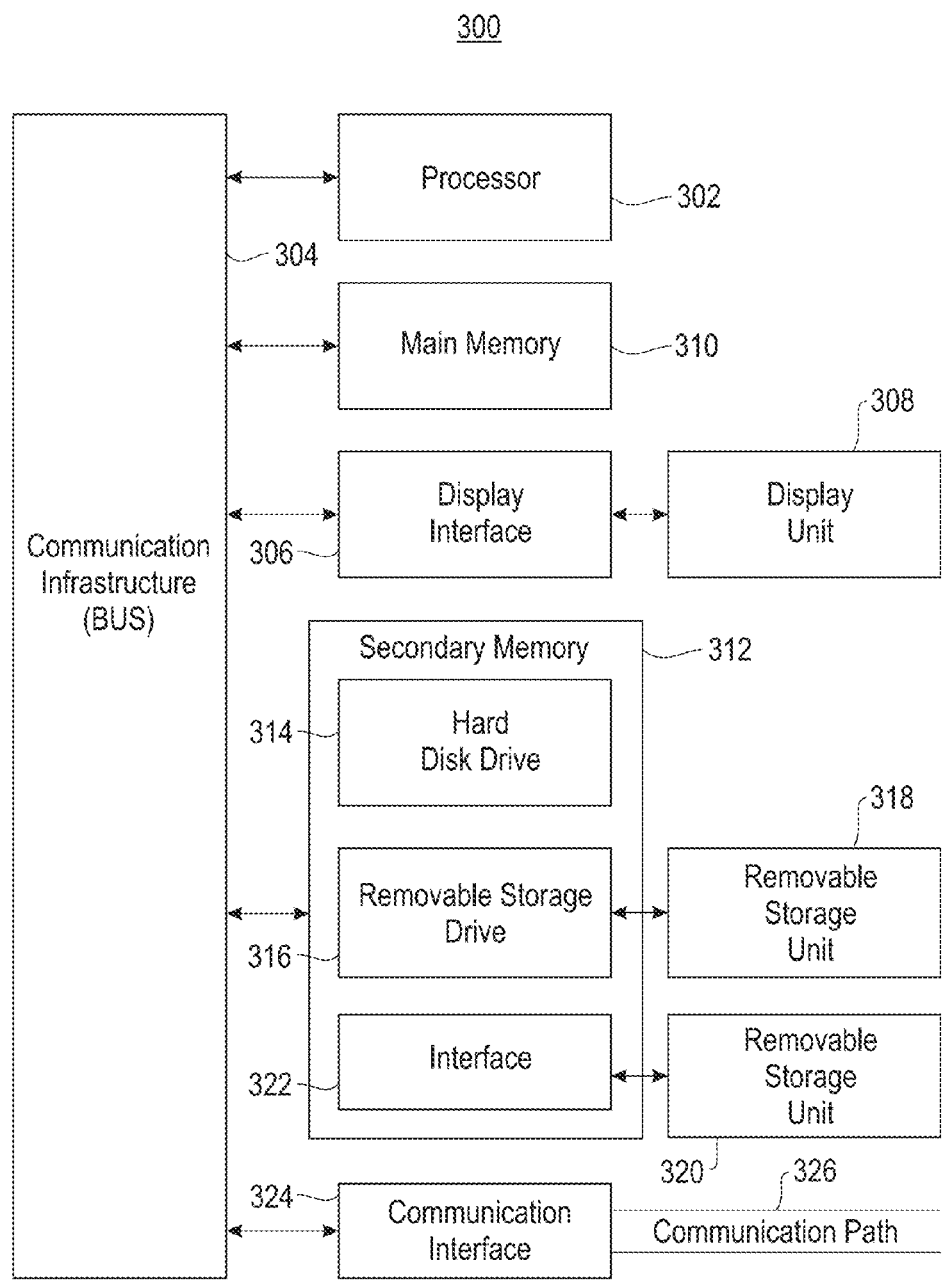
FIG. 26 is a high level block diagram showing an information processing circuit useful for implementing one embodiment of the invention.

FIG. 26 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, non-transitory computer-useable storage medium, and method for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
  presenting a test vector to a component of a processor array, wherein the component generates output in response to the test vector presented;
  making a first determination as to whether the component is faulty based on the output generated and an expected output; and
  based on the first determination, selectively signaling a switch of the processor array to bypass the component by sending the switch a control packet indicative of at least one redundant data path of the processor array to select for routing one or more packets around the component.

2. The method of claim 1, wherein the component is selected from the group consisting of a core circuit of the processor array, another switch of the processor array, and another data path of the processor array.

3. The method of claim 1, wherein making a first determination as to whether the component is faulty comprises:
determining whether the output generated matches the expected output.

4. The method of claim 3, wherein selectively signaling a switch of the processor array to bypass the component further comprises:
in response to determining the output generated does not match the expected output, signaling the switch to bypass the component by sending the control packet to the switch, wherein the control packet includes at least one configuration bit indicating a redundant data path connected to the switch to select for propagation of packets between components of the processor array.

5. The method of claim 1, wherein each redundant data path interconnects a pair of non-adjacent switches of the processor array.

6. The method of claim 4, wherein the redundant data path propagates packets to a redundant switch of the processor array for recovering the component.

7. The method of claim 4, wherein the redundant data path propagates packets to a redundant core circuit of the processor array for recovering the component.

8. A system comprising a computer processor, a computer-readable hardware storage medium, and program code embodied with the computer-readable hardware storage medium for execution by the computer processor to implement a method comprising:
presenting a test vector to a component of a processor array, wherein the component generates output in response to the test vector presented;
making a first determination as to whether the component is faulty based on the output generated and an expected output; and
based on the first determination, selectively signaling a switch of the processor array to bypass the component by sending the switch a control packet indicative of at least one redundant data path of the processor array to select for routing one or more packets around the component.

9. The system of claim 8, wherein the component is selected from the group consisting of a core circuit of the processor array, another switch of the processor array, and another data path of the processor array.

10. The system of claim 8, wherein making a first determination as to whether the component is faulty comprises:
determining whether the output generated matches the expected output.

11. The system of claim 10, wherein selectively signaling a switch of the processor array to bypass the component further comprises:
in response to determining the output generated does not match the expected output, signaling the switch to bypass the component by sending the control packet to the switch, wherein the control packet includes at least one configuration bit indicating a redundant data path connected to the switch to select for propagation of packets between components of the processor array.

12. The system of claim 8, wherein each redundant data path interconnects a pair of non-adjacent switches of the processor array.

13. The system of claim 11, wherein the redundant data path propagates packets to a redundant switch of the processor array for recovering the component.

14. The system of claim 11, wherein the redundant data path propagates packets to a redundant core circuit of the processor array for recovering the component.

15. A computer program product comprising a computer-readable hardware storage medium having program code embodied therewith, the program code being executable by a computer to implement a method comprising:
presenting a test vector to a component of a processor array, wherein the component generates output in response to the test vector presented;
making a first determination as to whether the component is faulty based on the output generated and an expected output; and
based on the first determination, selectively signaling a switch of the processor array to bypass the component by sending the switch a control packet indicative of at least one redundant data path of the processor array to select for routing one or more packets around the component.

16. The computer program product of claim 15, wherein the component is selected from the group consisting of a core circuit of the processor array, another switch of the processor array, and another data path of the processor array.

17. The computer program product of claim 15, wherein making a first determination as to whether the component is faulty comprises:
determining whether the output generated matches the expected output.

18. The computer program product of claim 17, wherein selectively signaling a switch of the processor array to bypass the component further comprises:
in response to determining the output generated does not match the expected output, signaling the switch to bypass the component by sending the control packet to the switch, wherein the control packet includes at least one configuration bit indicating a redundant data path connected to the switch to select for propagation of packets between components of the processor array.

19. The computer program product of claim 15, wherein each redundant data path interconnects a pair of non-adjacent switches of the processor array.

20. The computer program product of claim 18, wherein the redundant data path propagates packets to one of a redundant switch or a redundant core circuit of the processor array for recovering the component.

* * * * *